(12) United States Patent
Vangal et al.

(10) Patent No.: US 11,231,731 B2
(45) Date of Patent: Jan. 25, 2022

(54) SYSTEM, APPARATUS AND METHOD FOR SENSOR-DRIVEN AND HEURISTIC-BASED MINIMUM ENERGY POINT TRACKING IN A PROCESSOR

(71) Applicant: Intel Corporation, Santa Clara, CA (US)

(72) Inventors: Sriram R. Vangal, Portland, OR (US); Jayanth Mallanayakanahalli Devaraju, Hillsboro, OR (US); Vivek De, Beaverton, OR (US); Robert Milstrey, Folsom, CA (US); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 16/455,929

(22) Filed: Jun. 28, 2019

(65) Prior Publication Data
US 2020/0409399 A1 Dec. 31, 2020

(51) Int. Cl.
| | | |
|---|---|---|
| *G06F 1/3203* | (2019.01) | |
| *G06F 1/28* | (2006.01) | |
| *G05F 1/46* | (2006.01) | |
| *G06F 16/901* | (2019.01) | |
| *G06F 16/90* | (2019.01) | |

(52) U.S. Cl.
CPC ............... *G05F 1/462* (2013.01); *G06F 1/28* (2013.01); *G06F 1/3203* (2013.01); *G06F 16/9017* (2019.01)

(58) Field of Classification Search
CPC .... G05F 1/462; G06F 16/9017; G06F 1/3203; G06F 1/28

USPC ................. 713/300, 320, 323, 330
See application file for complete search history.

(56) References Cited

U.S. PATENT DOCUMENTS

| | | | |
|---|---|---|---|
| 10,108,212 B2 | 10/2018 | Park et al. | |
| 2002/0194509 A1* | 12/2002 | Plante | G06F 1/206 713/300 |
| 2013/0345892 A1* | 12/2013 | Lin | H03K 19/00369 700/299 |
| 2015/0069857 A1 | 3/2015 | Diewald et al. | |
| 2017/0083033 A1 | 3/2017 | Park et al. | |
| 2018/0299849 A1* | 10/2018 | Martin | G05B 15/02 |
| 2019/0094897 A1 | 3/2019 | Vangal et al. | |

(Continued)

OTHER PUBLICATIONS

Ababei, Cristinel and Tamma, Chandana; "Distributed Minimum Energy Point Tracking for Systems-on-Chip"; Department of Electrical and Computer Engineering, Marquette University, Milwaukee, WI, USA, pp. 246-251. (Year: 2014).*

(Continued)

*Primary Examiner* — Michael J Brown
(74) *Attorney, Agent, or Firm* — Trop, Pruner & Hu, P.C.

(57) ABSTRACT

In one embodiment, a processor includes a minimum energy point (MEP) controller to: generate a change in thermal tracking information, based at least in part on prior and current thermal information; generate a change in activity tracking information, based at least in part on prior activity information and current activity information; and determine a MEP performance state based at least in part on the change in thermal tracking information and the change in activity tracking information. Other embodiments are described and claimed.

20 Claims, 23 Drawing Sheets

(56) References Cited

U.S. PATENT DOCUMENTS

2019/0094931 A1 3/2019 Ahmed

OTHER PUBLICATIONS

International Searching Authority, "Notification of Transmittal of the International Search Report and the Written Opinion of the International Searching Authority," dated Jul. 9, 2020, in International application No. PCT/US2020/023570.
Jun Shiomi et al., "Minimum Energy Point Tracking with All-Digital On-Chip Sensors," Jun. 2018, 10 pages.
Mohammad Saber Golanbari, et al., "Runtime Adjustment of IoT Systems-on-Chips for Minimum Energy Operation," Jun. 2018, 7 pages.
International Application No. PCT/US18/20272, filed Feb. 28, 2018, entitled, "Controlling A Processing Performance Level Depending on Energy Expenditure," by Intel Corporation.

* cited by examiner

SYSTEM, APPARATUS AND METHOD FOR SENSOR-DRIVEN AND HEURISTIC-BASED MINIMUM ENERGY POINT TRACKING IN A PROCESSOR

TECHNICAL FIELD

Embodiments relate to controlling power to digital integrated circuits to reduce energy consumption under various conditions.

BACKGROUND

Energy consumption in most digital integrated circuits is highly dependent on the supply voltage that powers the integrated circuits and on the frequency of the clock that controls the switching of the integrated circuits. Today's integrated circuits are able to operate over a wide dynamic range of both supply voltage and frequency, which can result in a widely varying range of energy efficiencies. In particular, the best energy efficiencies in digital CMOS silicon may be achieved around the "near-threshold voltage" (NTV) regime with an optimum supply voltage and frequency and a distinct minimum energy point (MEP), where energy efficiencies can be 5-10x better than nominal supply operation. The optimum voltage and MEP can vary widely across workload activity and with process and temperature variations. Non-linear integrated voltage regulator (IVR) efficiencies can further shift MEP and optimum voltage, as the energy consumed by the entire system is taken into account. Finding a truly optimal MEP can make a significant difference in the energy consumed by the system. Current techniques fail to do so in an efficient manner.

DETAILED DESCRIPTION

Figure 1:
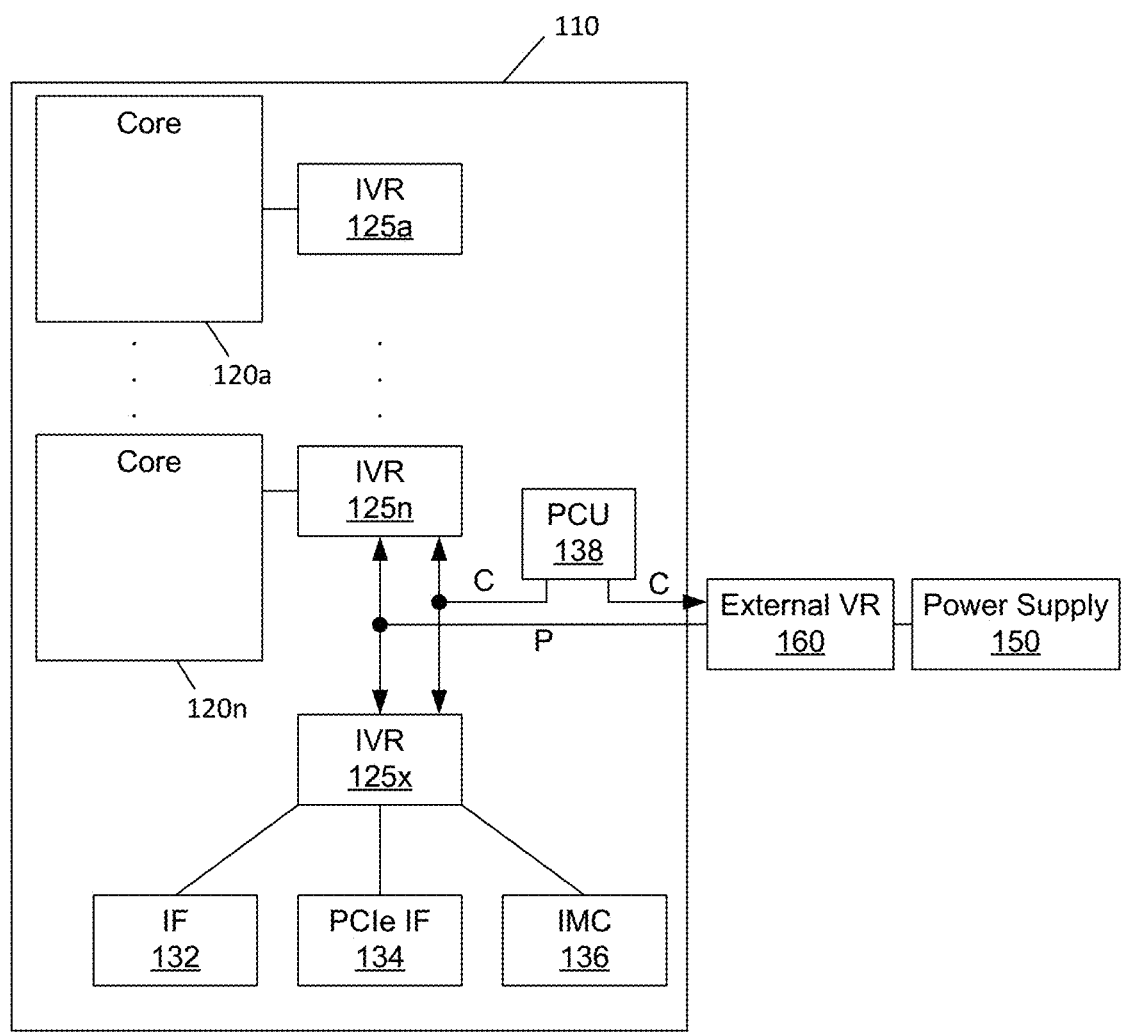
FIG. 1 is a block diagram of a portion of a system in accordance with an embodiment of the present invention.

In various embodiments, a processor is configured with a minimum energy point (MEP) control circuit to determine and track a MEP of the processor and/or its constituent components, including one or more cores or other processing circuits. To enable efficient tracking of MEP over a lifetime of the processor at high speed and low impact, embodiments leverage an efficient sensor-driven energy computation technique to arrive at the MEP. As such, embodiments may determine and track MEP for the processor with high speed and low complexity, in contrast to conventional one point (at a time) sweep-based energy computing methods, which perform many update iterations to processor operating voltage and operating frequency, in an effort to identify an MEP for a given workload.

With embodiments herein, sensor-driven and heuristic techniques provide fast real-time MEP tracking, resulting in simplified relative-computational computations, with reduced overhead. As a result, embodiments may realize better MEP tracking, as the techniques herein enable a determination of an updated MEP point substantially faster as compared to a recursive/expensive search, when operating conditions of a processor change. Stated another way, a conventional (e.g., dynamic voltage frequency scaling (DVFS)) technique to identify a MEP, with multiple voltage and frequency updates, can be replaced in embodiments with intelligent and direct computational hardware to predict MEP and update operation directly to this operating point in a single step, improving performance.

In embodiments, a MEP controller may leverage sensor-driven data and heuristics to quickly compute and relock to a new optimal MEP point, using one or more pre-characterized (and per-die programmable) lookup tables (LUTs). With embodiments, the MEP may be determined in a relative manner as compared to a computationally expensive absolute MEP tracking method to intelligently adjust an optimum MEP.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

One power management logic included in PCU 138 may be a MEP controller that is configured to readily and efficiently identify a MEP operating point based at least in part on dynamic processor conditions including changes in thermal information and/or activity information. Still further, the MEP controller may determine an initial MEP operating point based at least in part on a sweep of a plurality of operating voltage and operating frequency points and a process variation of the processor. Thereafter, the MEP controller may identify an appropriate update to the MEP operating point based at least in part on one or more of activity tracking information and temperature tracking information, as described herein.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
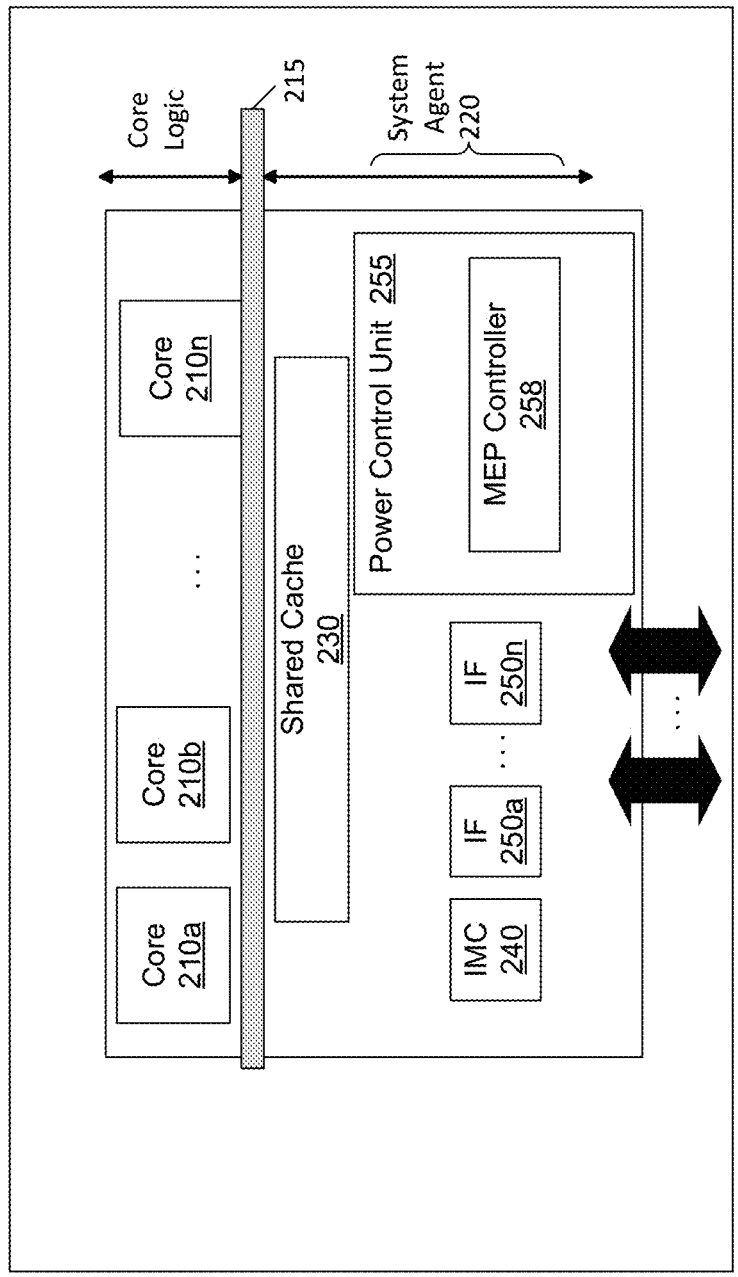
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes a MEP controller 258 that may determine an initial MEP point for processor 200. In addition, MEP controller 258 may dynamically determine one or more updates to the MEP operating point based at least in part on activity tracking information and/or temperature tracking information as described herein. In addition, at appropriate age-related time durations, MEP controller 258 may determine an updated optimum MEP performance state.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard.

Figure 3:
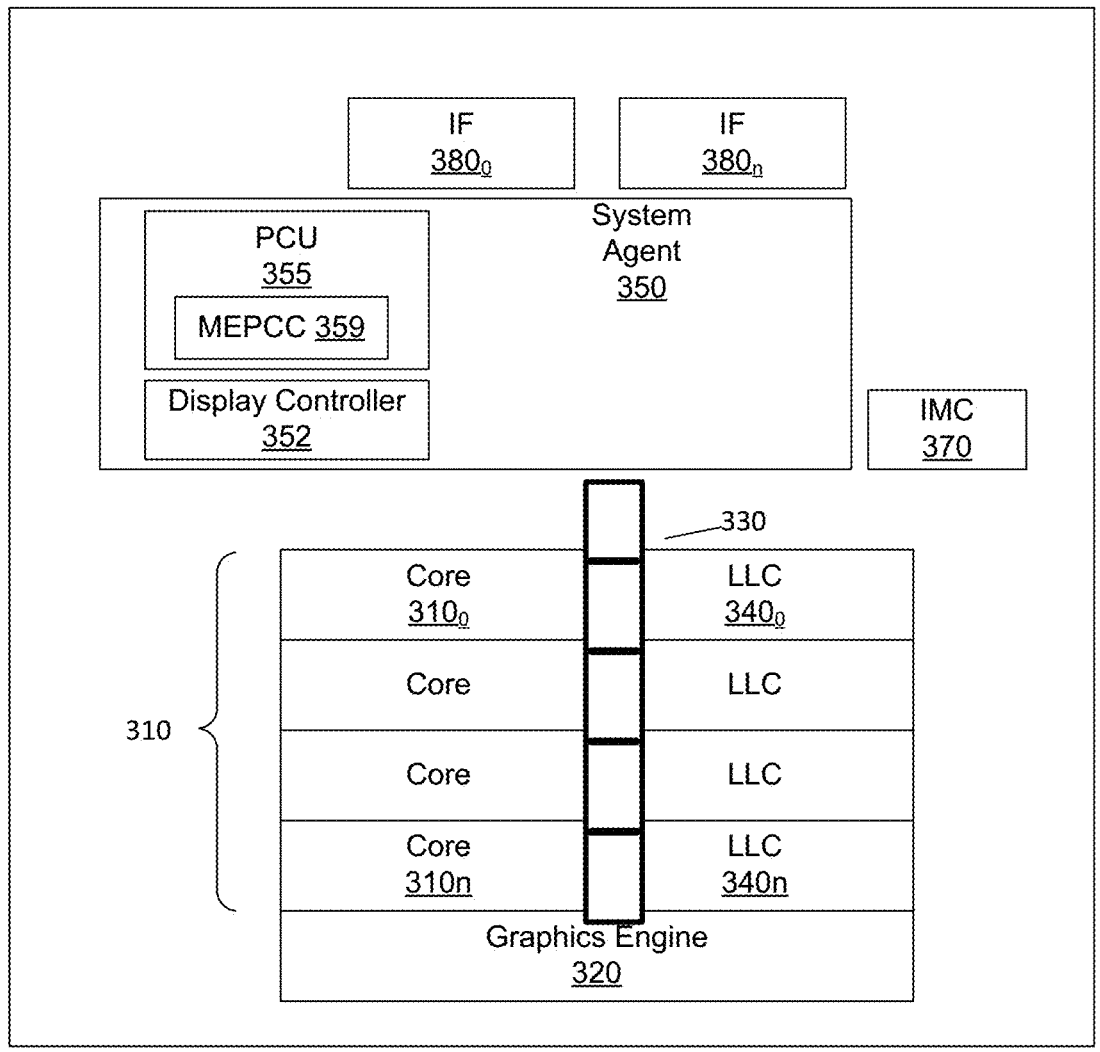
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a MEP controller 359, which may determine initial and updated MEP operating points based on some or all of process variation information, activity tracking information and temperature tracking information, using a heuristic-based approach to leverage information in one or more lookup tables, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
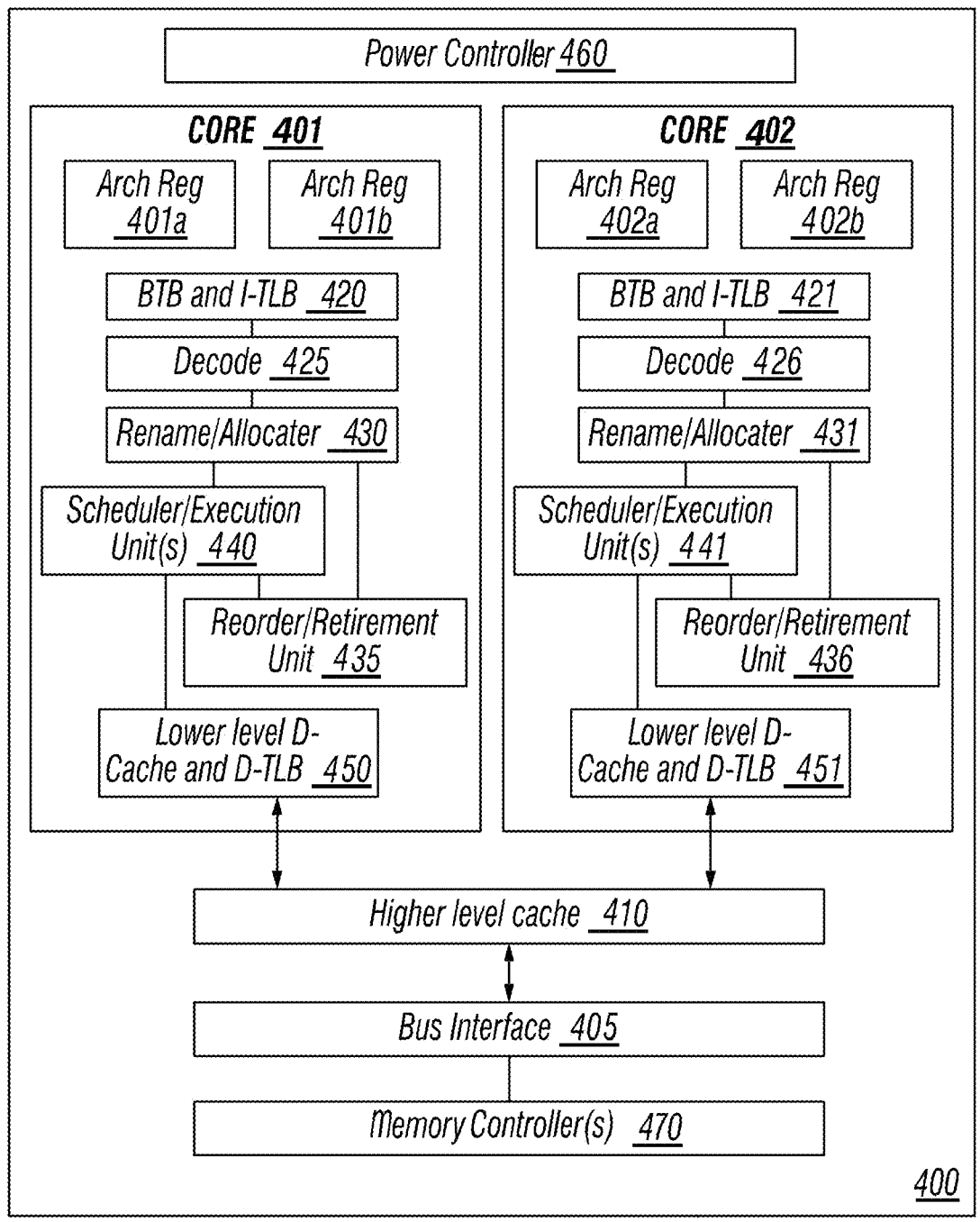
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
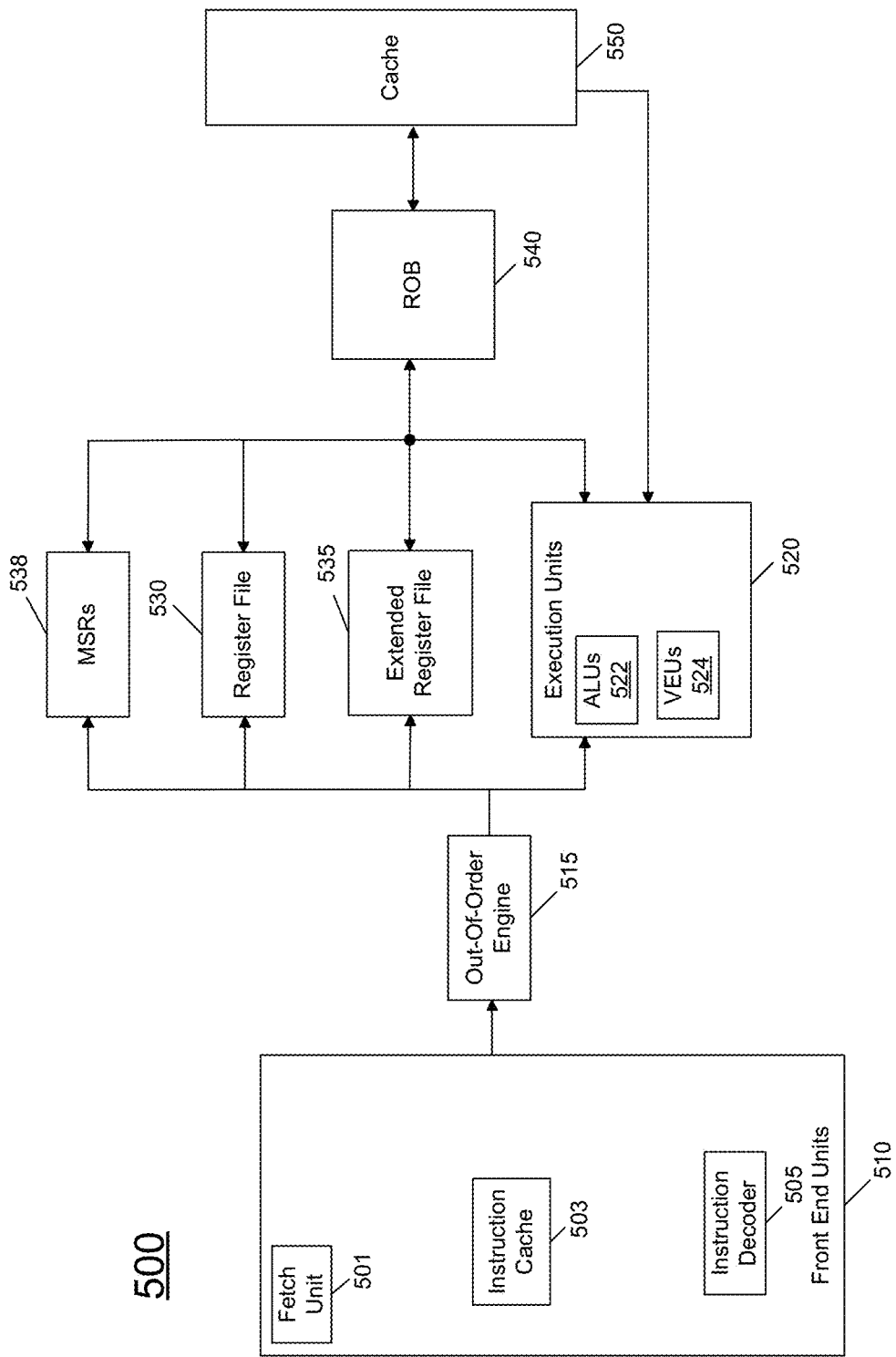
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
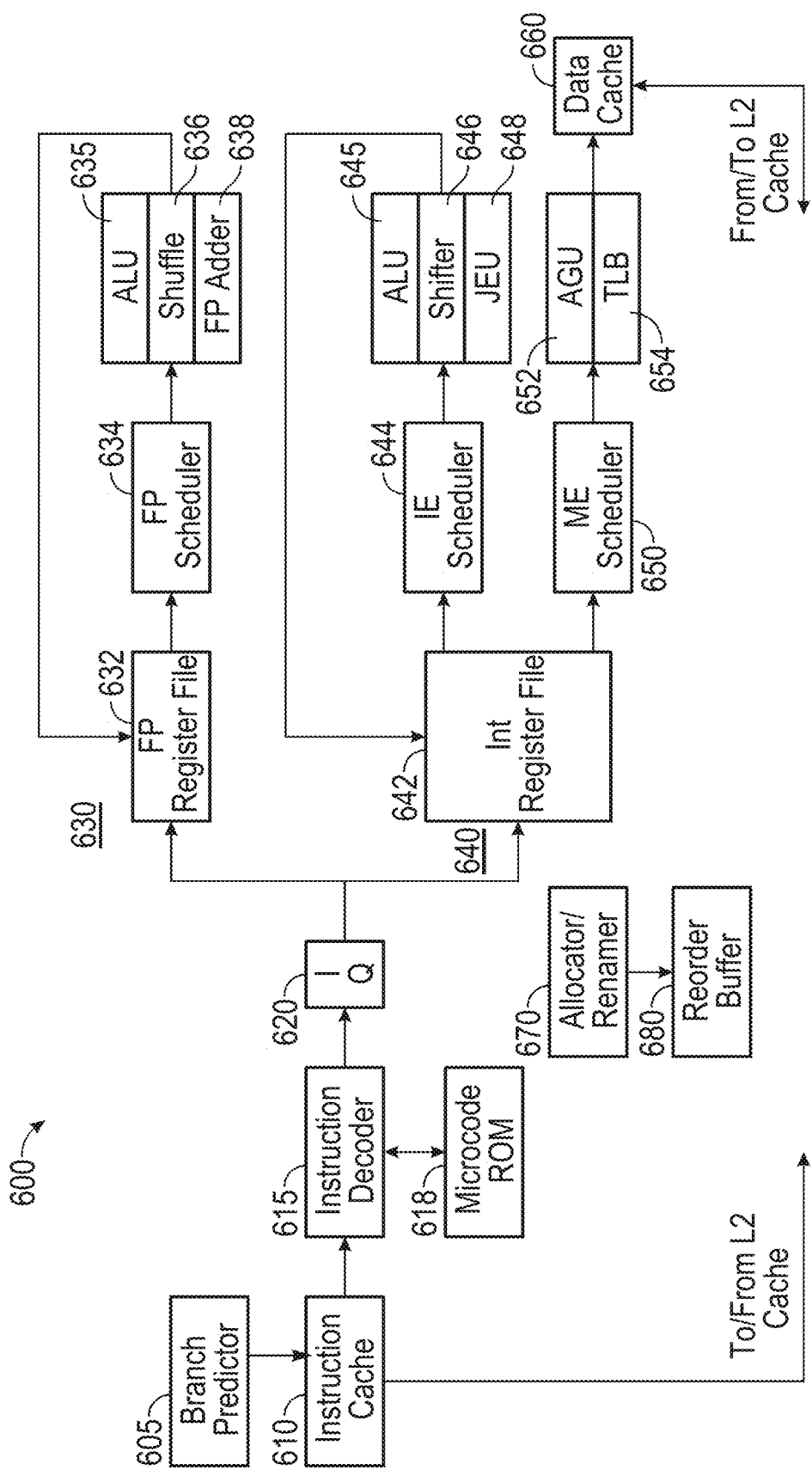
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
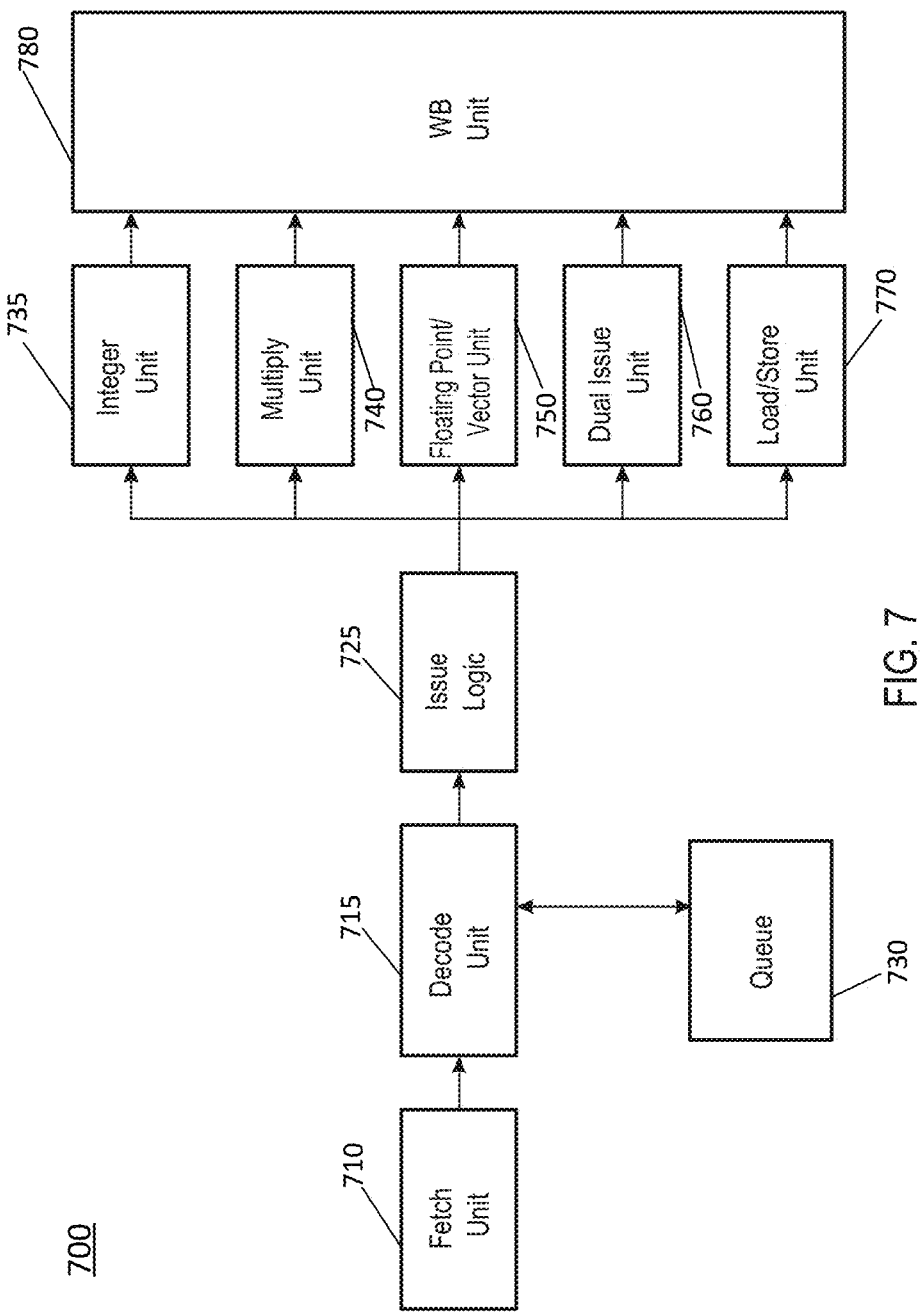
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
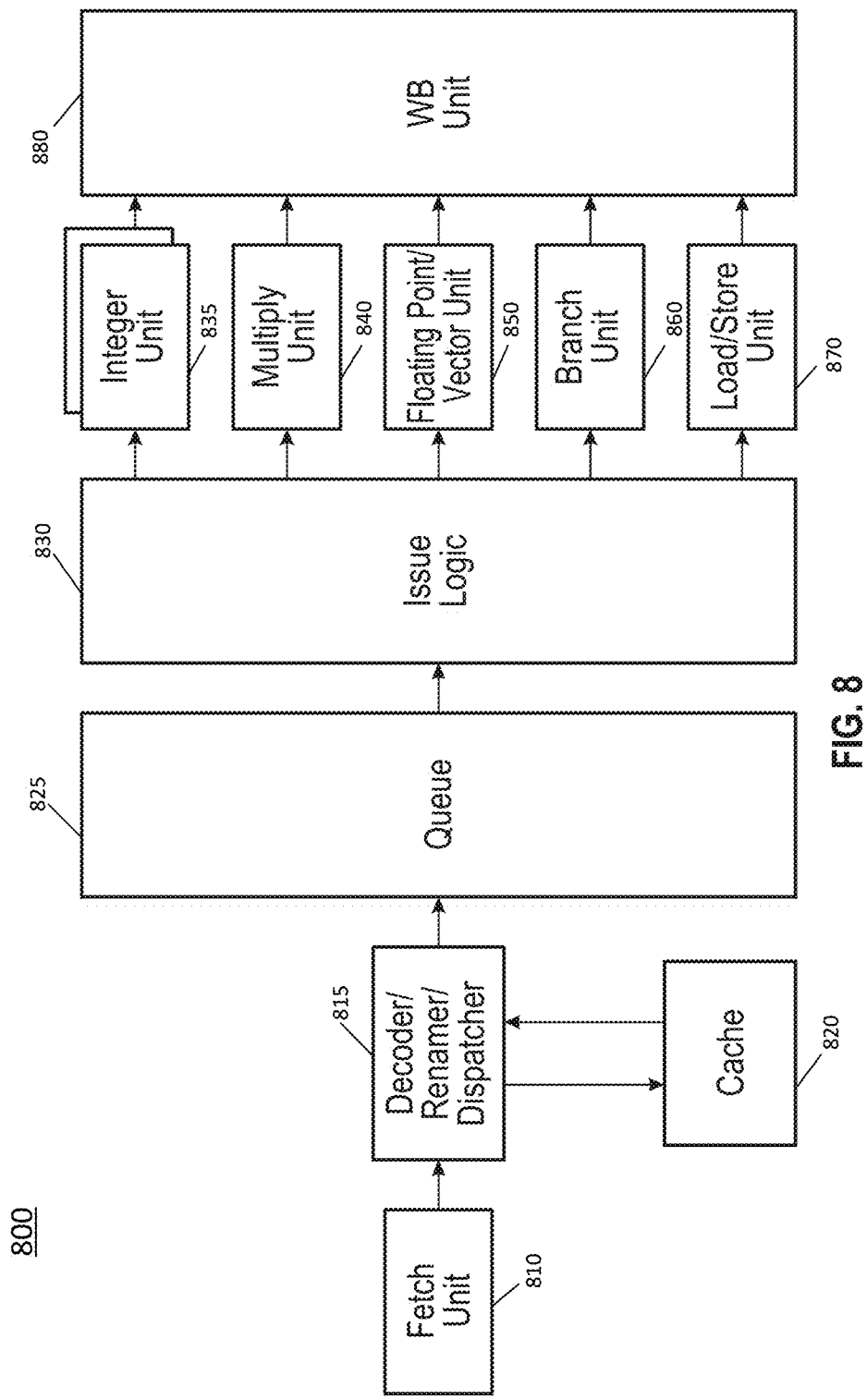
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
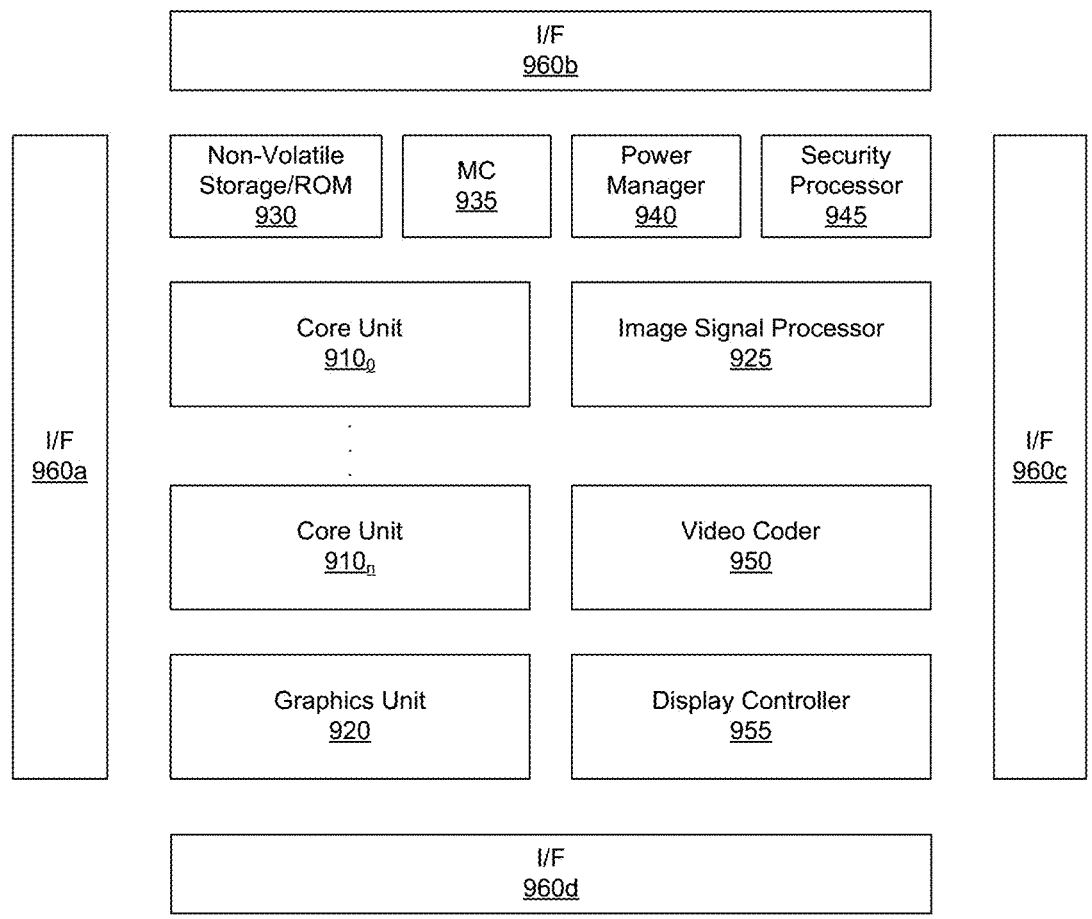
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
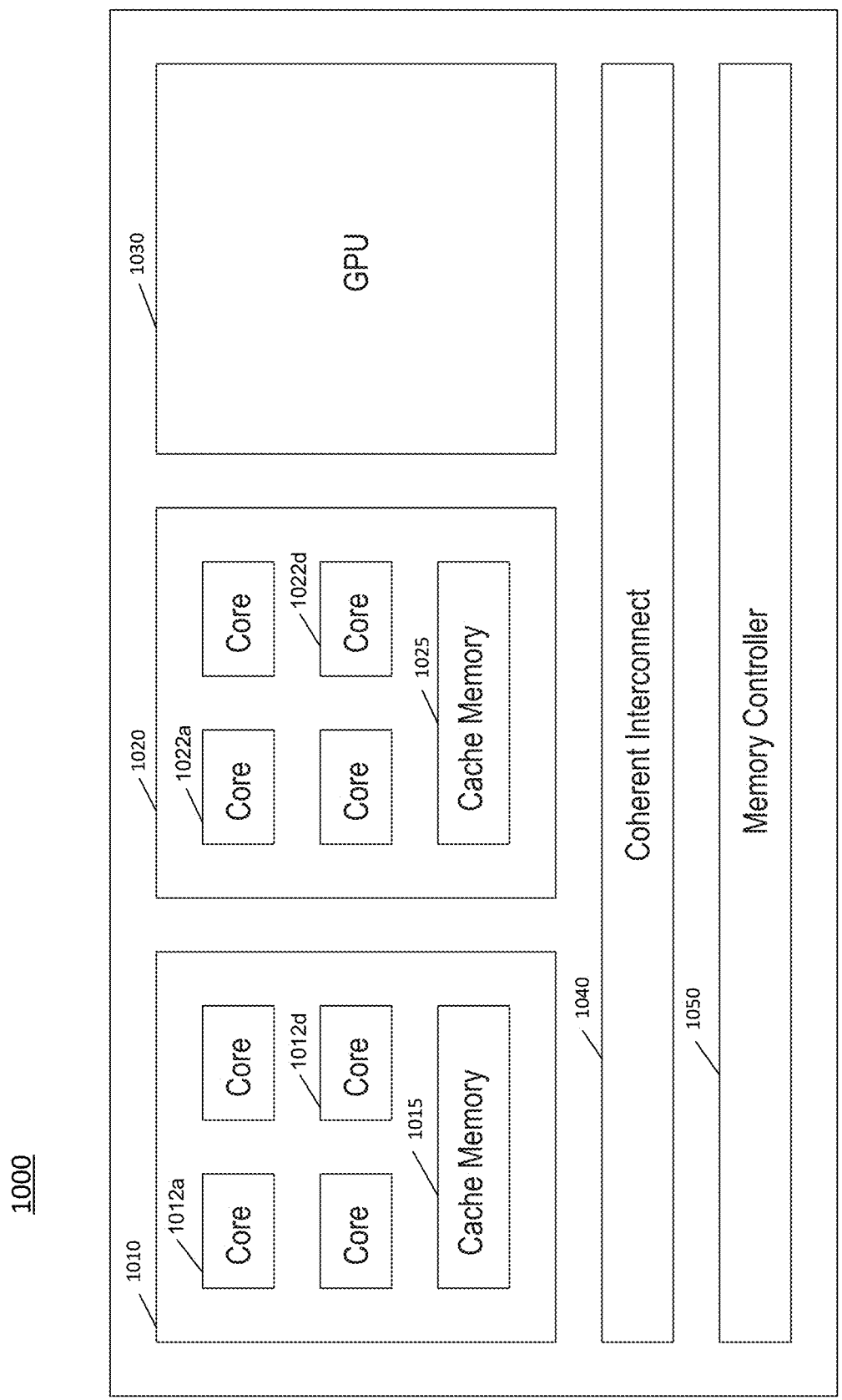
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
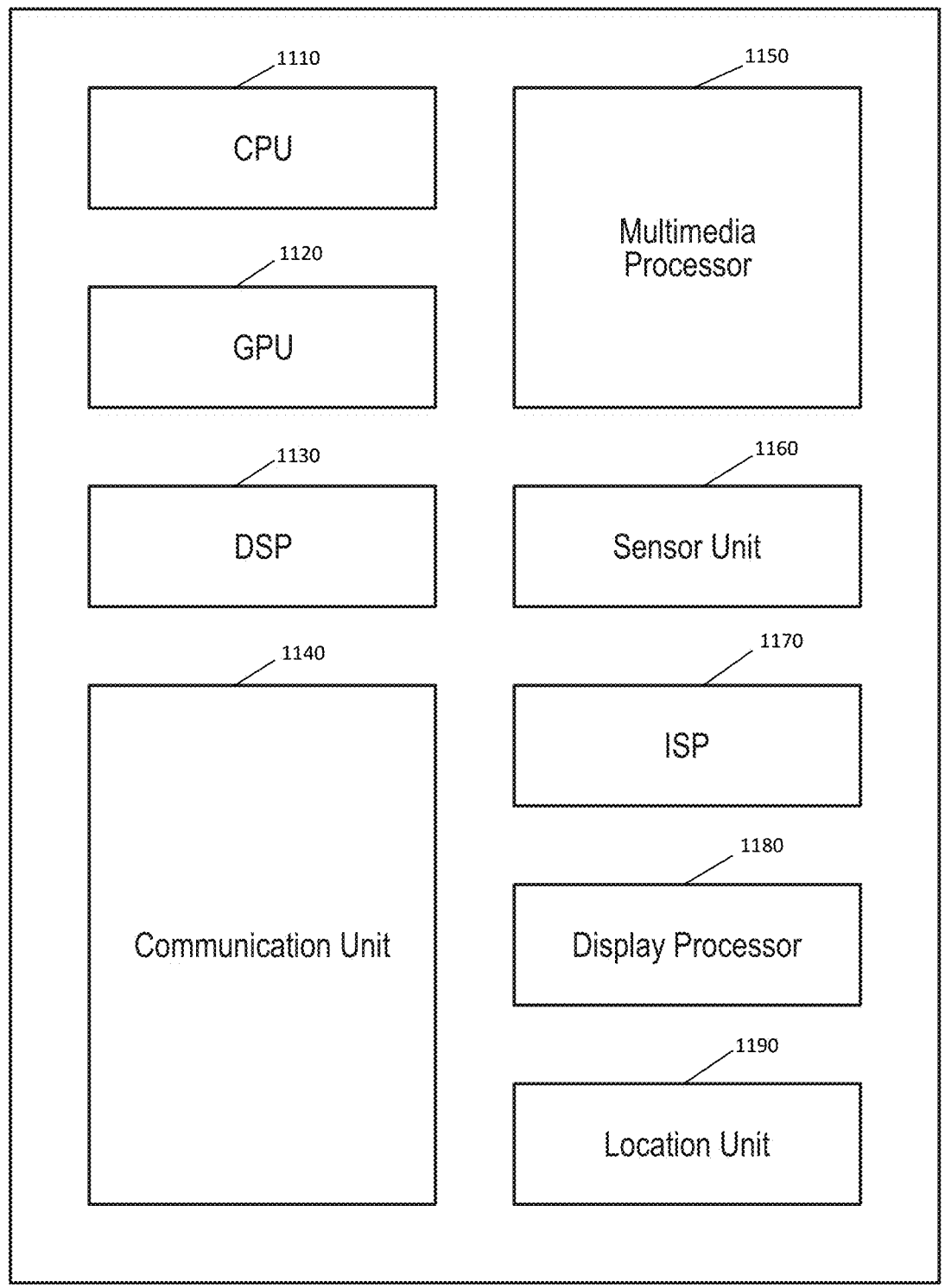
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
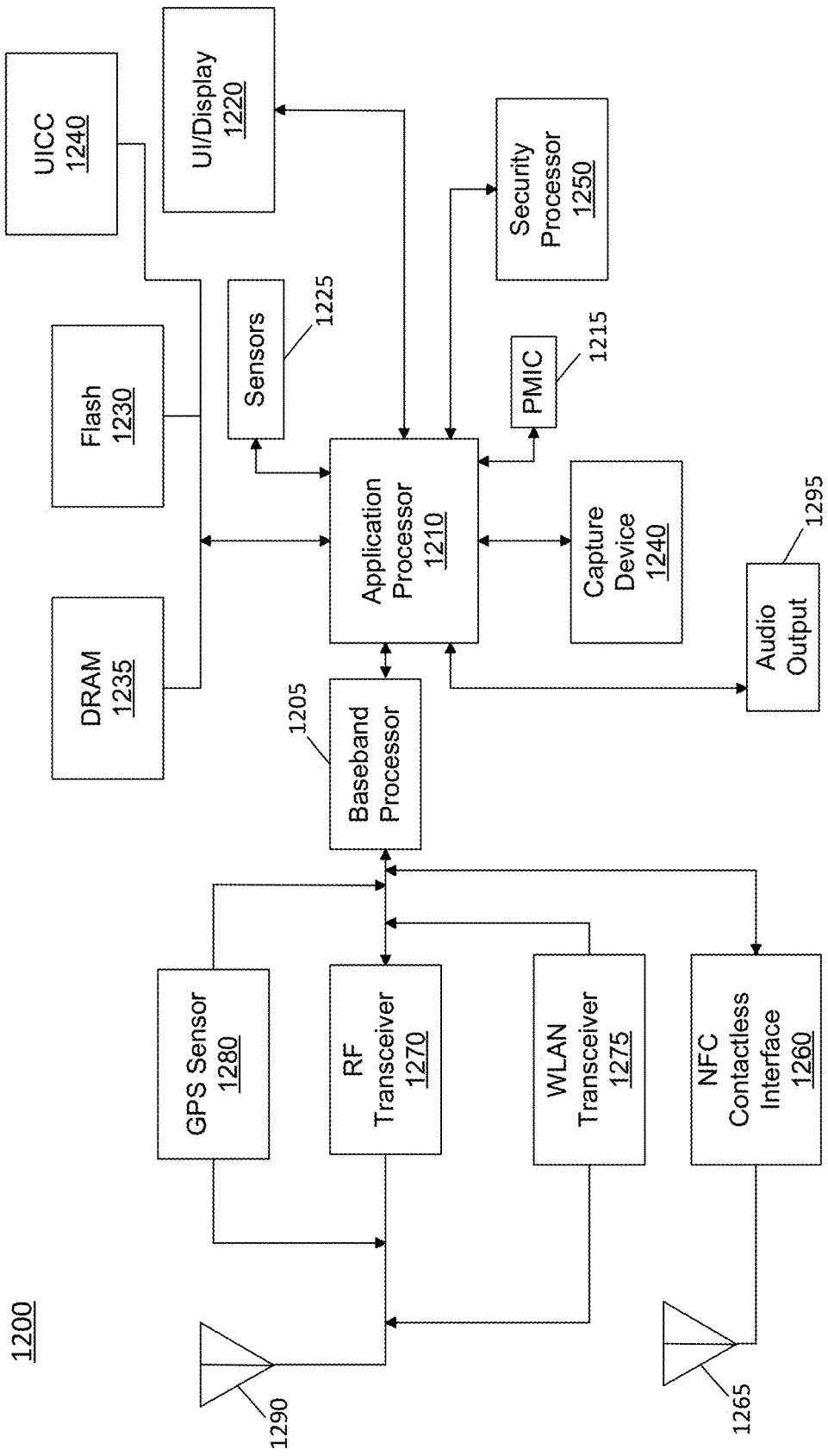
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
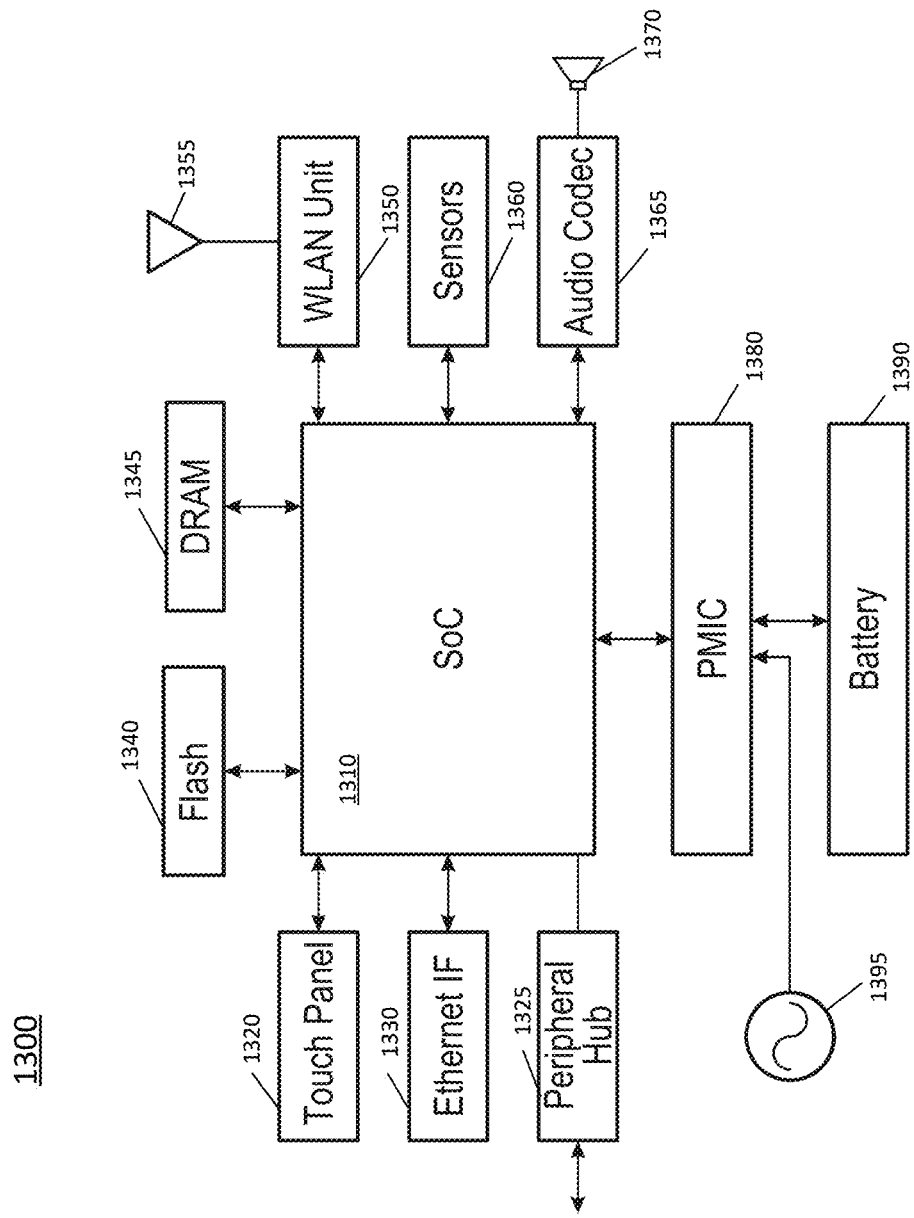
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
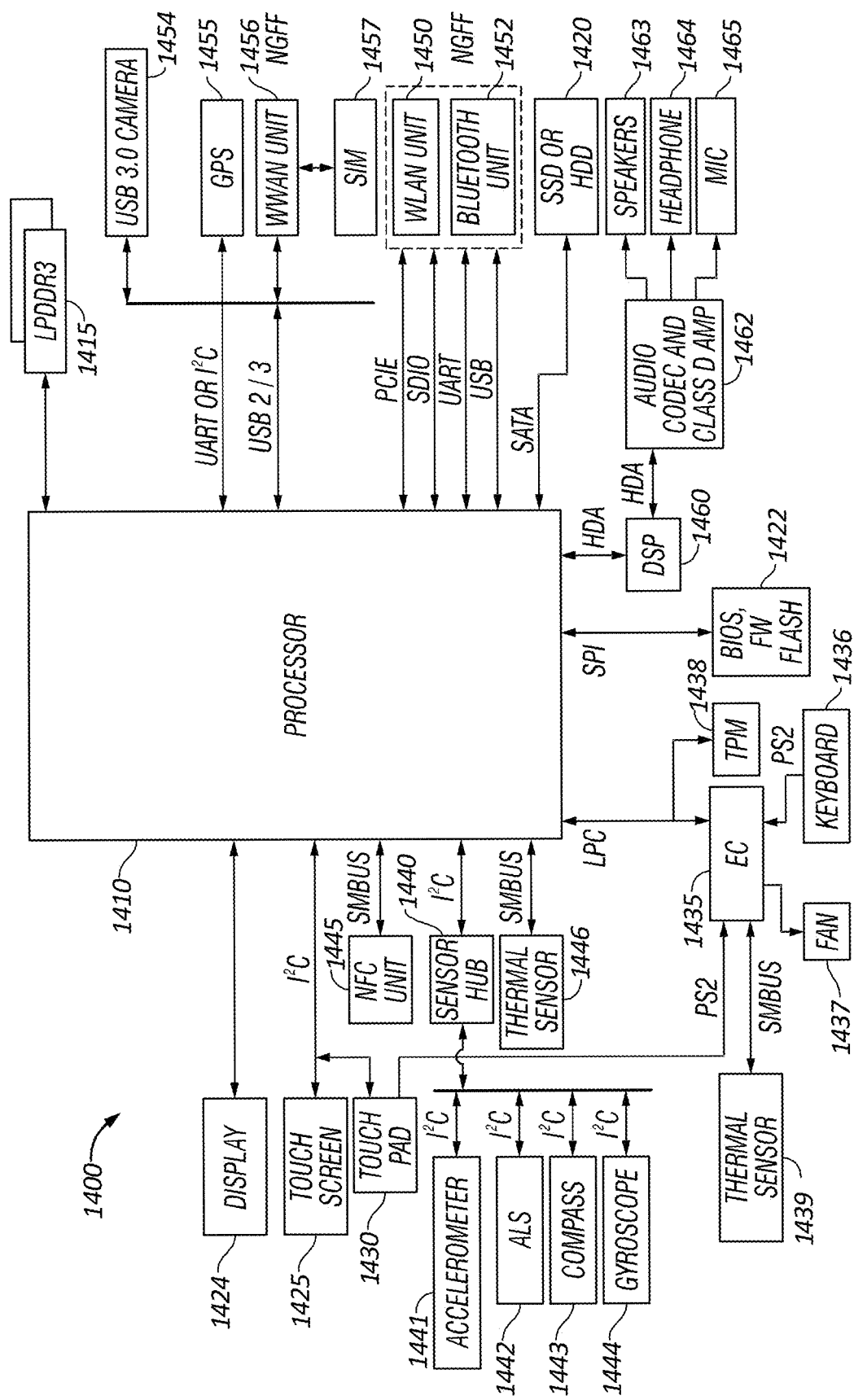
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
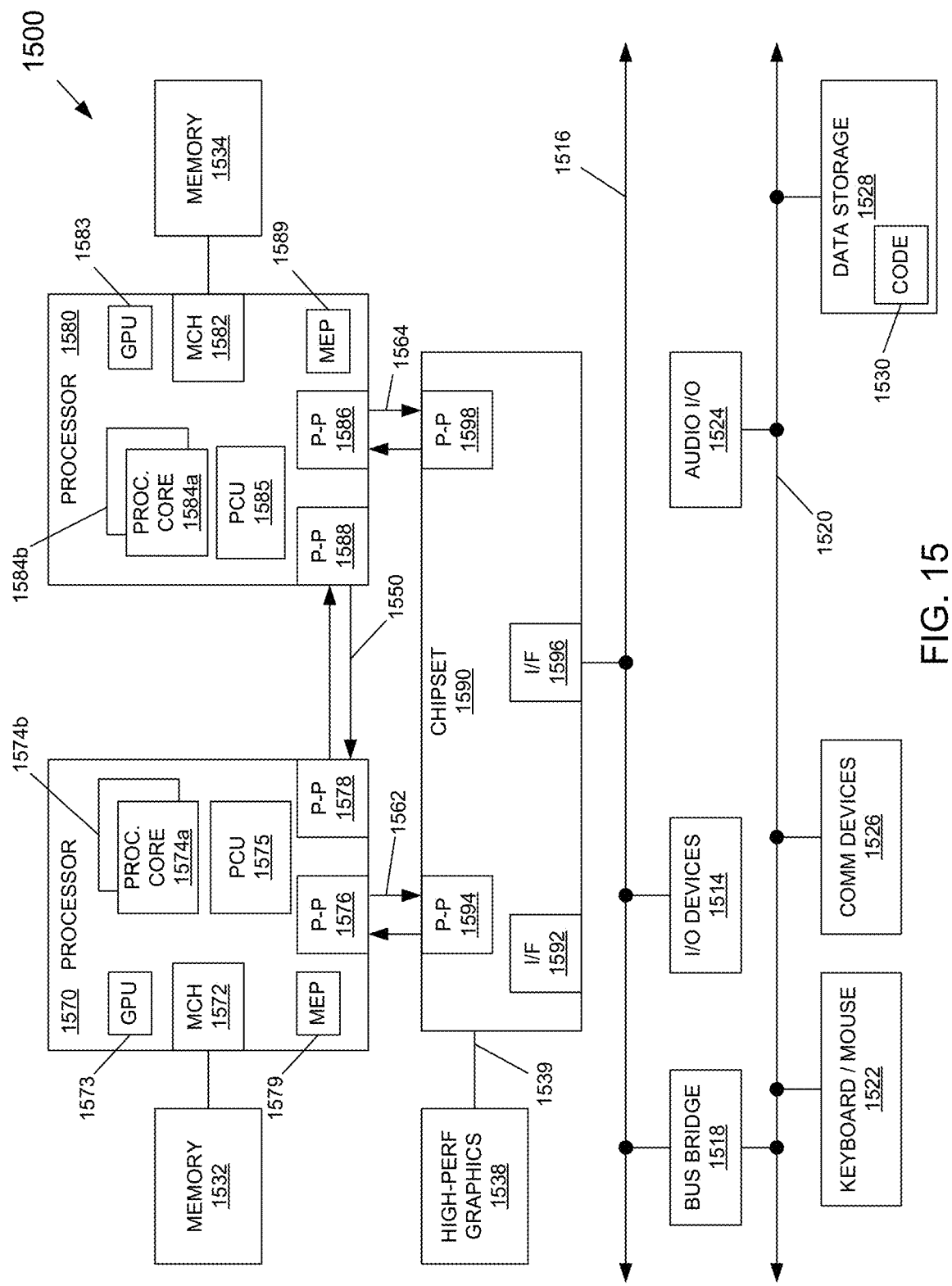
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574*a* and 1574*b* and processor cores 1584*a* and 1584*b*), although potentially many more cores may be present in the processors. In addition, each of processors 1570 and 1580 also may include a graphics processor unit (GPU) 1573, 1583 to perform graphics operations. Each of the processors can include a PCU 1575, 1585 to perform processor-based power management. In the embodiment of FIG. 15, processors 1570, 1580 may include MEP controllers 1579, 1589, adapted separately from PCUs 1575, 1585, to perform MEP-based determinations and provide initial and updated MEP values to the corresponding PCUs, to enable the PCU to enhance its functionality to perform energy control in addition to power control, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
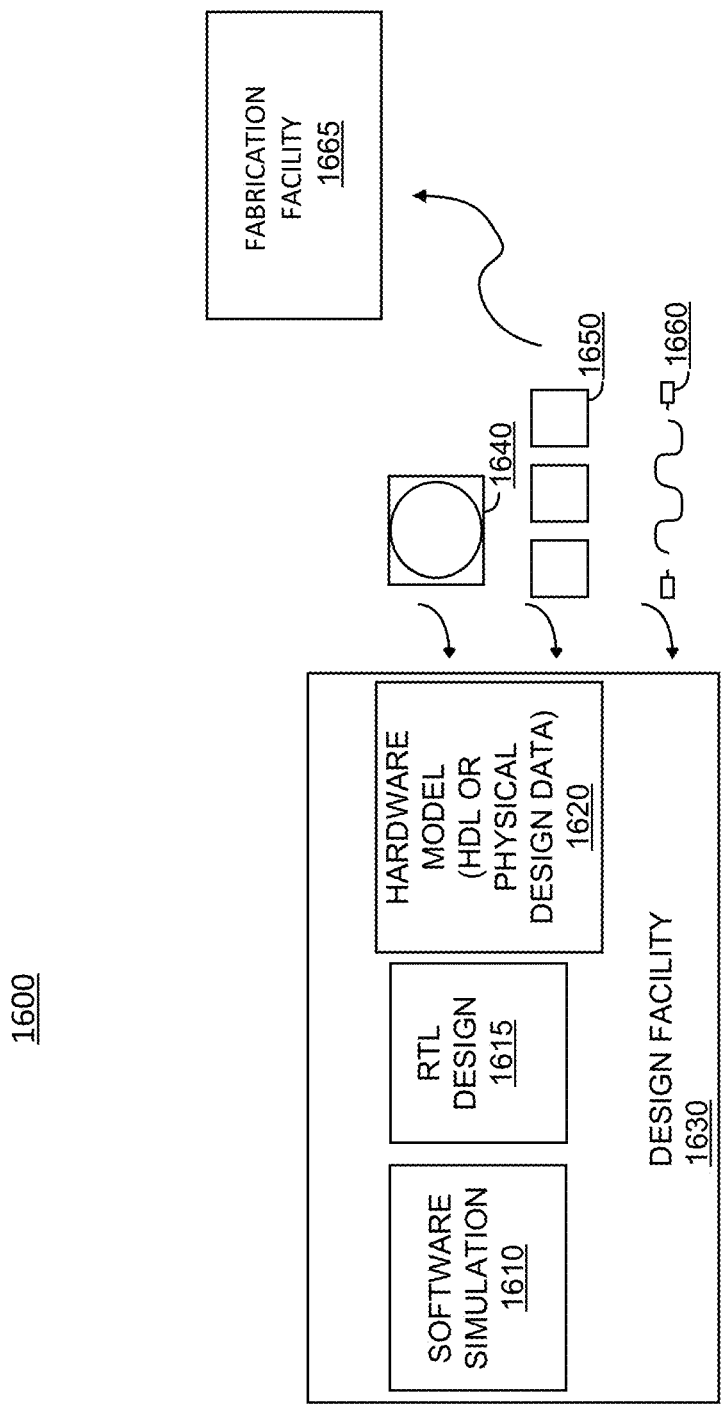
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
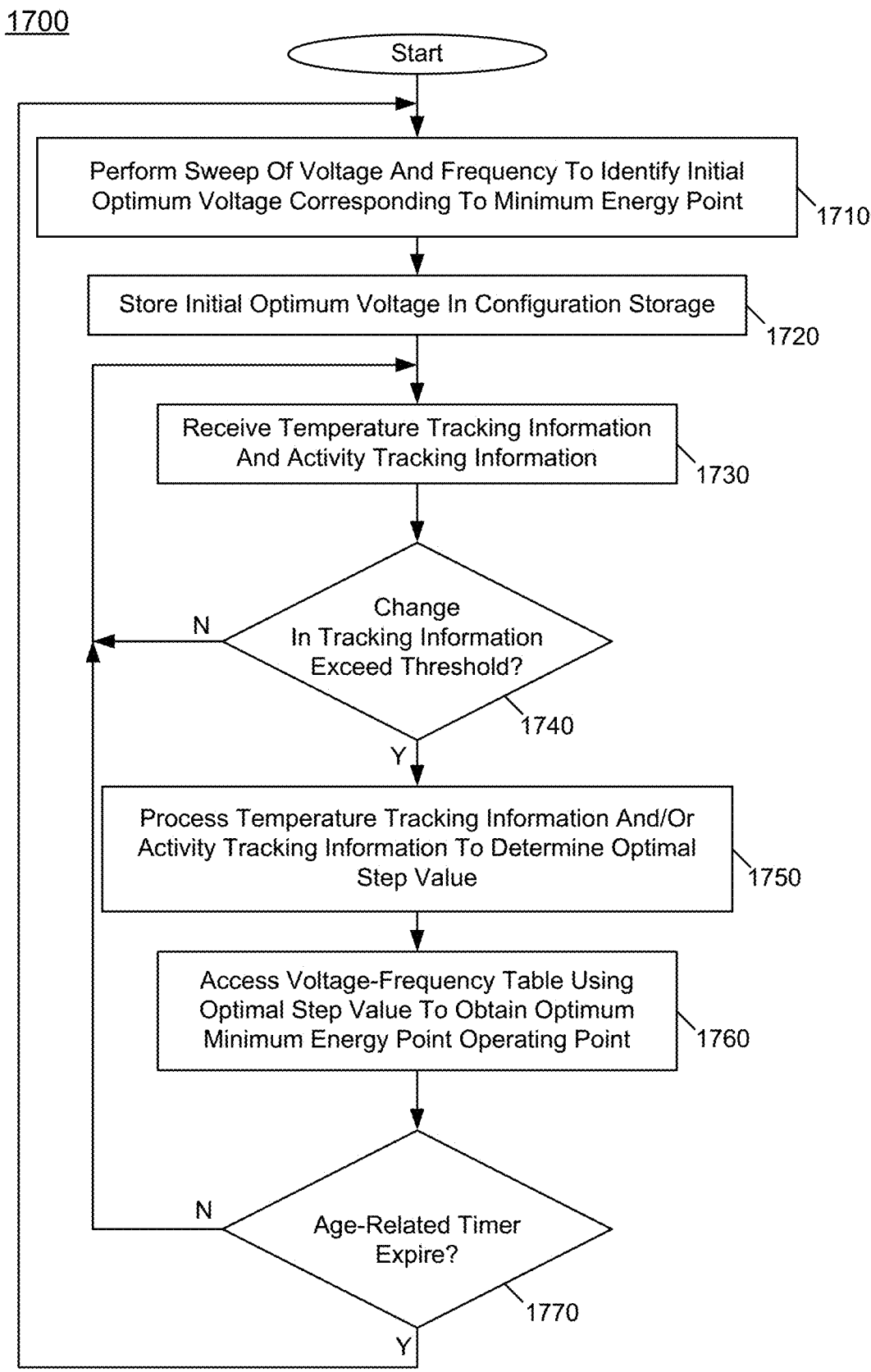
FIG. 17 is a flow diagram of a method in accordance with an embodiment of the present invention.

Referring now to FIG. 17, shown is a flow diagram of a method in accordance with an embodiment of the present invention. More specifically, method 1700 of FIG. 17 is a method for determining optimal minimum energy points (MEPs) in a processor in accordance with an embodiment. As such, method 1700 may be performed by hardware circuitry, firmware, software and/or combinations thereof. For example, at least portions of method 1700 may be performed by a MEP controller of a processor, such as may be implemented in a power controller of the processor.

As illustrated, method 1700 begins by performing a sweep of voltage and frequency to identify an initial optimum voltage (block 1710). Such operation may occur initially upon a first initialization of the processor, e.g., when configured in a given computing platform, either during manufacturing testing and/or in the field. More specifically, this optimum voltage may correspond to a minimum energy point for the processor, based upon this sweep of voltage and frequency. For example, a power controller may cause the processor to operate at a set of different operating points each having a given operating voltage and operating frequency. Based on sensor information an energy calculation (e.g., an energy per operation value) can be obtained during operation at these different operating points, from which the MEP can be identified. And within this MEP, an initial optimum voltage is identified. Next, at block 1720, this initial optimum voltage may be stored in a configuration storage, e.g., present in a configuration register of a power controller. Note that at this point, with an initial optimum voltage and optimal frequency corresponding to a MEP, a processor may begin or continue normal operation.

Thus as further illustrated in FIG. 17, at block 1730 during such normal operation, temperature tracking information and activity tracking information may be received in the MEP controller. In an embodiment, temperature tracking information may be based on thermal information from a plurality of thermal sensors that may be adapted in the processor. And the activity tracking information may, in an embodiment, be based at least in part on activity counter information regarding various micro-architectural activities of the processor, including bandwidth information, cache operation, instructions per cycle information, among many other types of micro-architectural activity information.

Still with reference to FIG. 17, it is determined whether a change in either of these different types of tracking information exceeds a corresponding threshold (diamond 1740). If not, control passes back to block 1730 where additional tracking information may be received, e.g., for a next evaluation interval. Note that in different embodiments this evaluation interval may be according to a given timer, e.g., operating at a given clock rate. In other cases, this evaluation interval may be according to an event-based trigger, by an asynchronous change in operating condition that exceeds a threshold.

In any event, if it is determined that a change in at least one of these different types of tracking information exceeds a given threshold, control passes to block 1750. At block 1750 the temperature tracking information and/or the activity tracking information (e.g., one or both that exceeds a corresponding threshold) may be processed. For example, this tracking information may be encoded into a corresponding step value based at least in part on the level of the tracking information. And from such step values, further processing may be performed to determine an optimal step value.

Next, control passes to block 1760 where a voltage-frequency table may be accessed using the determined optimal step value. More specifically, based upon this optimal step value, a given entry of the voltage-frequency table may be accessed to obtain an optimum minimum energy point operating point. This MEP point may correspond to an operating voltage and frequency for this new optimum MEP. While shown not shown for ease of illustration in FIG. 17, understand that an update to the configuration storage to store the new optimum voltage can occur. Still further, understand that the power controller may control the processor to operate at this new optimum MEP.

Still with reference to FIG. 17, next may be determined whether an age-related timer has expired (diamond 1770). Understand that this age-related timer may correspond to a relatively long time duration, e.g., on the order of months, semi-annually, annually or so forth. This is so, as such a relatively long time duration may cause age-related deterioration of the processor, such that it is possible that the initial optimum voltage is no longer the correct voltage corresponding to a minimum energy point. Stated another way, this relatively long time duration is a process-sensitive time duration at which process-based degradation may occur. Thus if it is determined that such age-related timer expires, control passes back to block 1710 discussed above, where a full sweep may be performed. Otherwise, continued temperature and activity tracking may occur beginning at block 1730. Understand while shown at this high level in the embodiment of FIG. 17, many variations and alternatives are possible.

Figure 18:
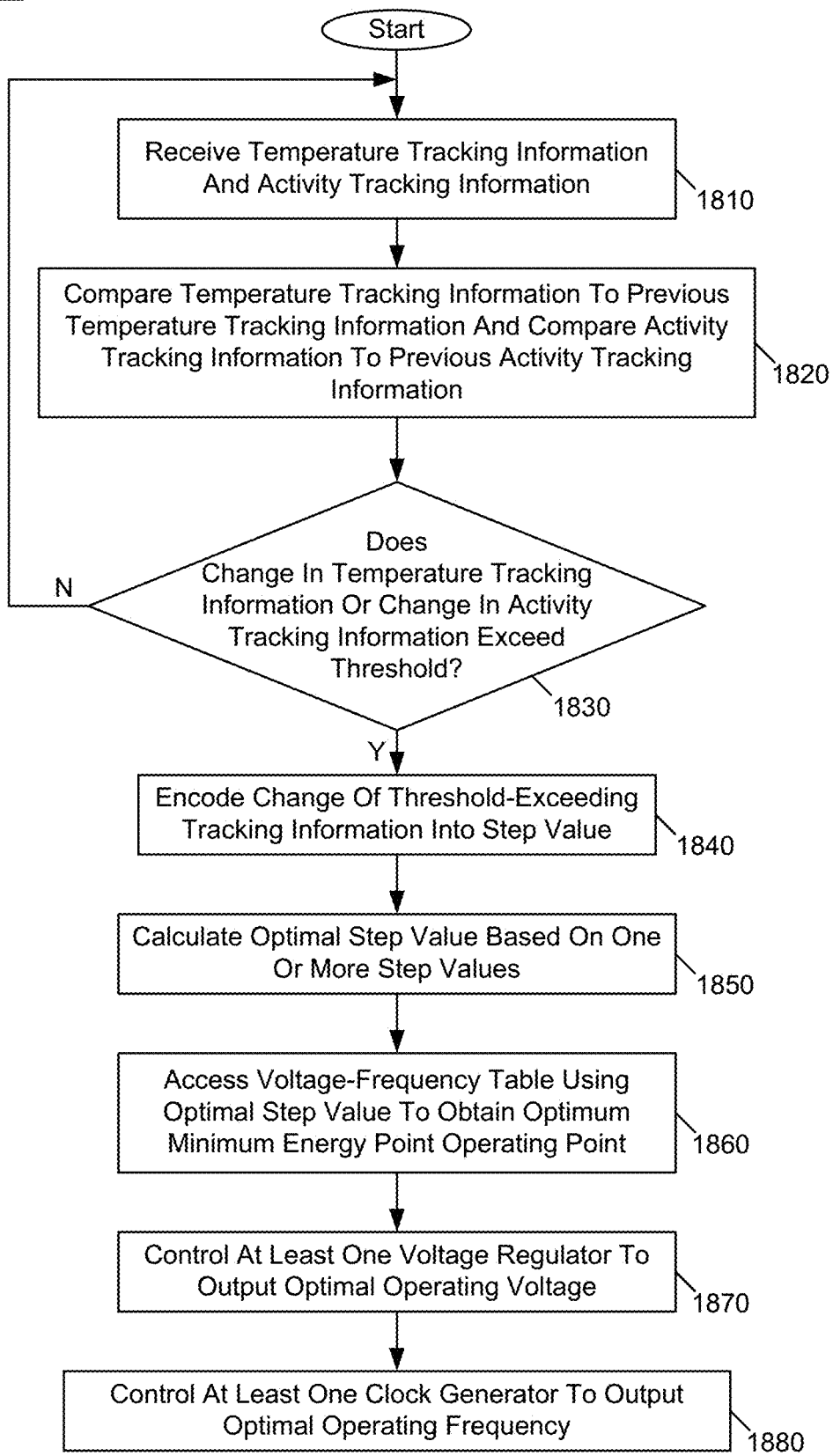
FIG. 18 is a flow diagram of a method in accordance with another embodiment of the present invention.

Referring now to FIG. 18, shown is a flow diagram of a method in accordance with another embodiment of the present invention. More specifically, method 1800 of FIG. 18 is more detailed method for performing tracking to determine appropriate update to a MEP in accordance with an embodiment of the present invention. As such, method 1800 may be performed by hardware circuitry, firmware, software and/or combinations thereof. For example, at least portions of method 1800 may be performed by a MEP controller.

As illustrated, method 1800 begins by receiving temperature tracking information and activity tracking information (block 1810), such as discussed above. Next, control passes to block 1820 where this tracking information may be compared to prior values of the tracking information. For example, the temperature tracking information may be compared to an immediately previous value of the temperature tracking information. Or in other cases, a moving average may be maintained to reflect a history of the tracking information (and to provide a filtering and/or hysteresis control technique). Similar options exist for the activity tracking information, and any other tracking information that may be used in particular embodiments. Note further that with history data, machine learning-based pattern matching algorithms may be used to analysis the history data to identify appropriate MEP values.

Still with reference to FIG. 18, next at diamond 1830 it is determined whether the change in tracking information exceeds a given threshold. For example, a first threshold may be associated with the temperature tracking information, such that if the change exceeds this threshold, the determination at diamond 1830 is positive for the temperature tracking information. And similarly, a second threshold may be associated with the activity tracking information, such that if the change exceeds this threshold, the determination at diamond 1830 is positive for the activity tracking information. If the change(s) are determined not to exceed any such threshold, no further operation occurs for this evaluation interval, and continued tracking is performed, beginning at block 1810.

With further reference to FIG. 18, instead if it is determined that a change in at least one of the values of the tracking information exceeds a threshold level, control passes to block 1840. At block 1840, the change of the threshold-exceeding tracking information may be encoded.

More specifically, this change in tracking information may be encoded into a step value. In an embodiment, this step value may be determined, e.g., with reference to a lookup table, in which an entry having a particular step value can be accessed using the amount of the change. For example, with regard to temperature, a temperature change of approximately 55° C. may be encoded into a step value of N equals 1. Similarly, an activity level change of, e.g., 2×, may map into a step value change of M equals 1. Of course many other example encodings are possible.

Still referring to FIG. 18, at block 1850 an optimal step value may be calculated based on these one more step values. In a particular embodiment, an addition operation may be performed between the step values (e.g., N and M) to obtain the optimal step value.

At block 1860, a voltage-frequency table may be accessed using the determined optimal step value to obtain an optimum MEP operating point. Next at block 1870 at least one voltage regulator of the processor may be controlled using the optimum MEP operating point. More specifically, the obtained operating voltage value can be provided to one or more voltage regulators to cause them to operate to output an operating voltage at this optimal operating voltage level. Similarly, at block 1880, at least one clock generator of the processor may be controlled using the optimum MEP operating point. More specifically, the obtained operating frequency value can be provided to one or more clock generators to cause them to operate to output a clock signal at this optimal operating frequency level. Understand while shown at this high level in FIG. 18, many variations and alternatives are possible.

Figure 19:
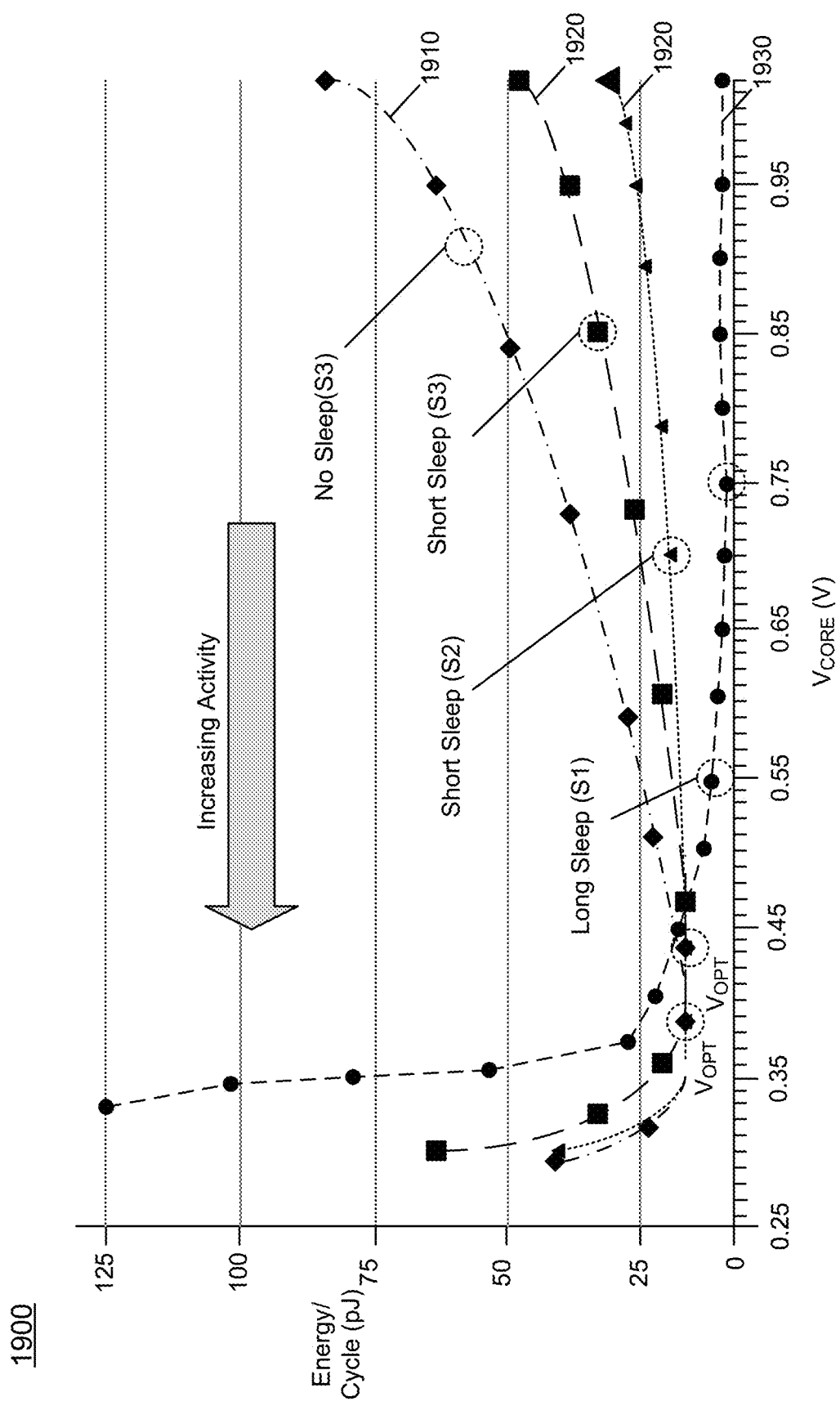
FIG. 19 is a graphical illustration of energy consumption with relation to operating voltage in accordance with an embodiment of the present invention.

Referring now to FIG. 19, shown is a graphical illustration of energy consumption with relation to operating voltage. For a given workload, there is an optimal operating voltage ($V_{opt}$) that corresponds to a MEP. As shown in FIG. 19, for different workloads, the energy consumed reaches a MEP at $V_{opt}$, typically in the near-threshold voltage (NTV) region with 4-5× better energy efficiency as compared to higher operation points. From either direction (along the X-axis) at other operating voltages for the same workload, increased energy occurs. And as shown, $V_{opt}$ for different workloads (representative workloads curves are present at curves 1910, 1920, 1930 and 1940) can shift by hundreds of millivolts with workload activity as the processor cycles through various sleep modes. In addition, MEP and Vopt can also change with operating conditions (e.g., due to variations in process, voltage and temperature (PVT)). As such, embodiments may provide a measure of MEP tracking and adjustment to reduce energy consumption, illustrated in FIG. 19 with increasing activity (as moving towards the left along the X-axis).

As described herein, to reach the MEP, a power controller causes one or voltage regulators to generate an operating voltage at the determined MEP level. In addition, the PMU further causes one or more clock generators to generate one or more clock signals at the corresponding determined operating frequency of the MEP. Over a typical workload interval, energy per operation (Eop) calculations may be computed as follows:

$$Eop = (Vin*Iin\_avg)/Fmax = P/Fmax = P*T \quad \text{(Equation 1)}$$

where, Vin equals input voltage, Fmax equals maximum frequency, T=1/Fmax; and where, power (P)=Vin*Iin_avg, and Iin_avg is the average current consumed over the workload interval (T) and may be provided via current telemetry.

In a sweep operation, which may be performed at initialization of a processor to determine an initial MEP, and very infrequently to update this MEP to account for aging of the processor, a series of operations are performed. More specifically, Table 1 below illustrates a recursive sweep operation to determine an MEP. As shown, a MEP controller may compute the Eop at a plurality of points using Equation [1] to determine an optimum voltage ($V_{OPT}$). This MEP curve traversal may take some undesirable length of time, since the V/F sweep can consume substantial time due to repeated clock frequency and voltage change delays in an incremental manner.

TABLE 1

1. Start at a reference point (V1, F1)
2. Compute T1 = 1/F1 (reciprocal computation)
3. Compute Eop at point 1
4. Move to point 2 (V2, F2)
5. Compute T2 = 1/F2 (reciprocal computation)
6. Compute Eop at point 2
7. Compare Eop1 and Eop2
8. Take decision As described above, embodiments may minimally perform this sweep-based determination of MEP. Instead, after an initial MEP is determined according to a sweep such as performed in accordance with Table 1 above, embodiments may implement a faster parametric, sensor-based approach to run-time MEP tracking across PVT and workload conditions, with each variable being an input model parameter M.

Figure 20:
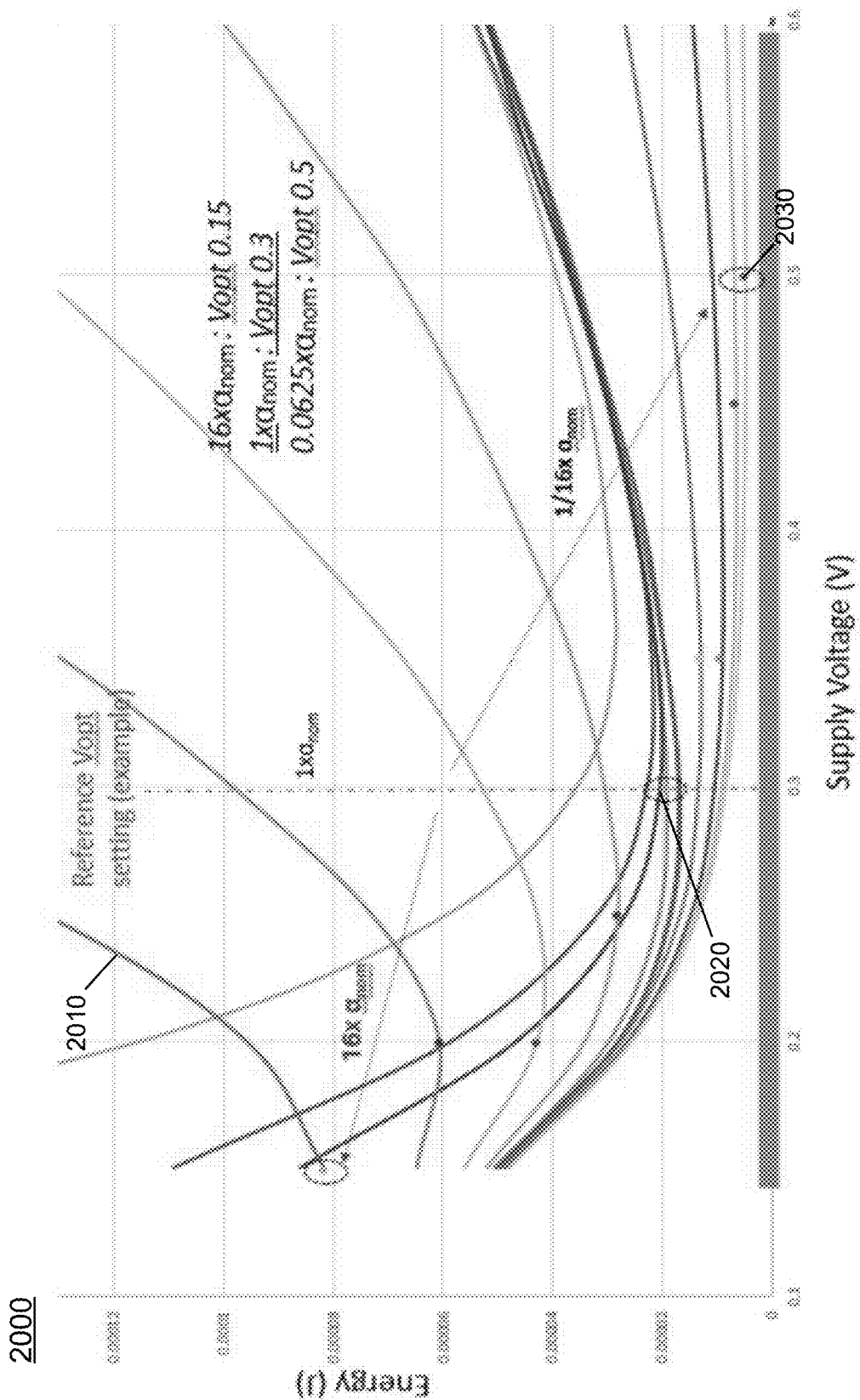
FIG. 20 is a set of representative simulated MEP curves for changes in workload activity in accordance with an embodiment of the present invention.

Referring now to FIG. 20, shown is a set of representative simulated MEP curves for changes in workload activity. As seen, diagram 2000 illustrates a difference in Vopt for different workloads. For example, for a given workload x, Vopt may be at approximately 0.3 volts for a first workload curve 2020. For a 16× increase in workload, as illustrated at curve 2010, Vopt may be at 0.15 volts. And finally, for a reduction in workload by 16×, Vopt may be at 0.5 volts, as shown in curve 2030. As seen, a workload-based switching activity factor ($\alpha$) is the single largest contributor to MEP optimum shift, with larger activity moving towards lower MEP values (and vice versa). In embodiments, powers of 2 can be used as activity steps, however any other multiple can be used.

Figure 21:
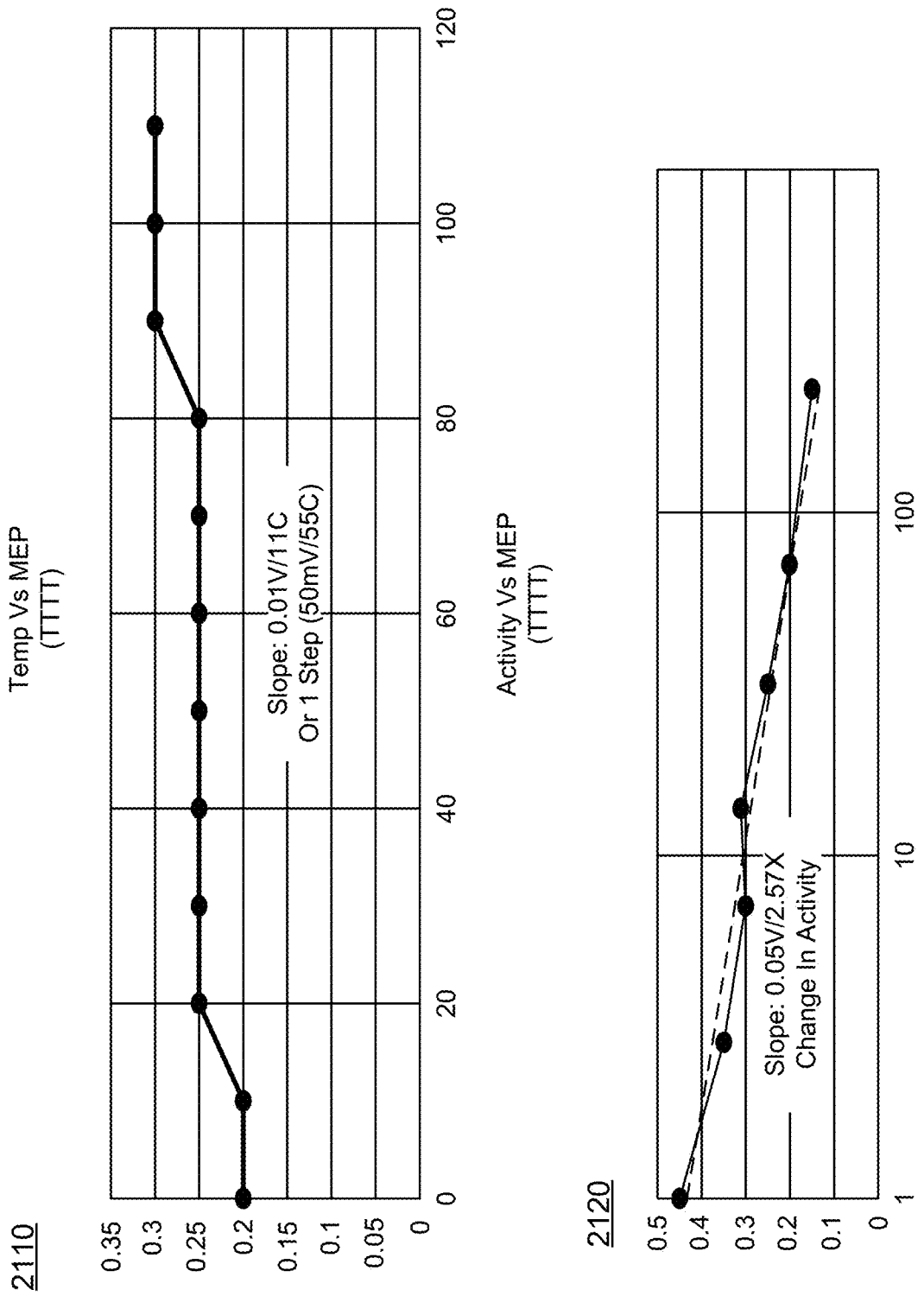
FIG. 21 is an example illustration of change in MEP versus temperature and activity in accordance with an embodiment of the present invention.

Referring now to FIG. 21, shown are example illustrations of change in MEP versus temperature (shown at diagram 2110) and change in MEP with regard to change in activity (illustrated at diagram 2120). As shown in diagram 2110, when varying die temperature and keeping all other parameters constant, there is a positive slope, with the MEP voltage shifting higher with higher temperatures. In this example, there is a representative slope of 10 mV for each 11 degree Centigrade change. Of course, understand that other slopes are possible. In general, increased leakage from increased temperature can shift the MEP $V_{OPT}$ to a higher optimum value (and vice versa).

As shown in diagram 2120 with a log-scale (for the X-axis), there is a negative slope for increasing workload changes, such that higher activity results in lower MEP V/F values. In this example, there is a change of 50 mV MEP voltage for approximately every 2.5× change in workload induced vector switching activity. With these considerations from FIG. 21, for a given process, $V_{OPT}$ changes are deterministic, depending on the temperature (T) and activity factor (a). More specifically, it can be seen that $V_{OPT}$ is proportional to (a*Temp+b*Alpha), where "a" and "b" slope parameters. Note that these values may be characterized by pre-silicon and/or post-silicon data. And as shown, the slopes a, b are in opposite directions (+ for a, minus (−) for b).

Figure 22:
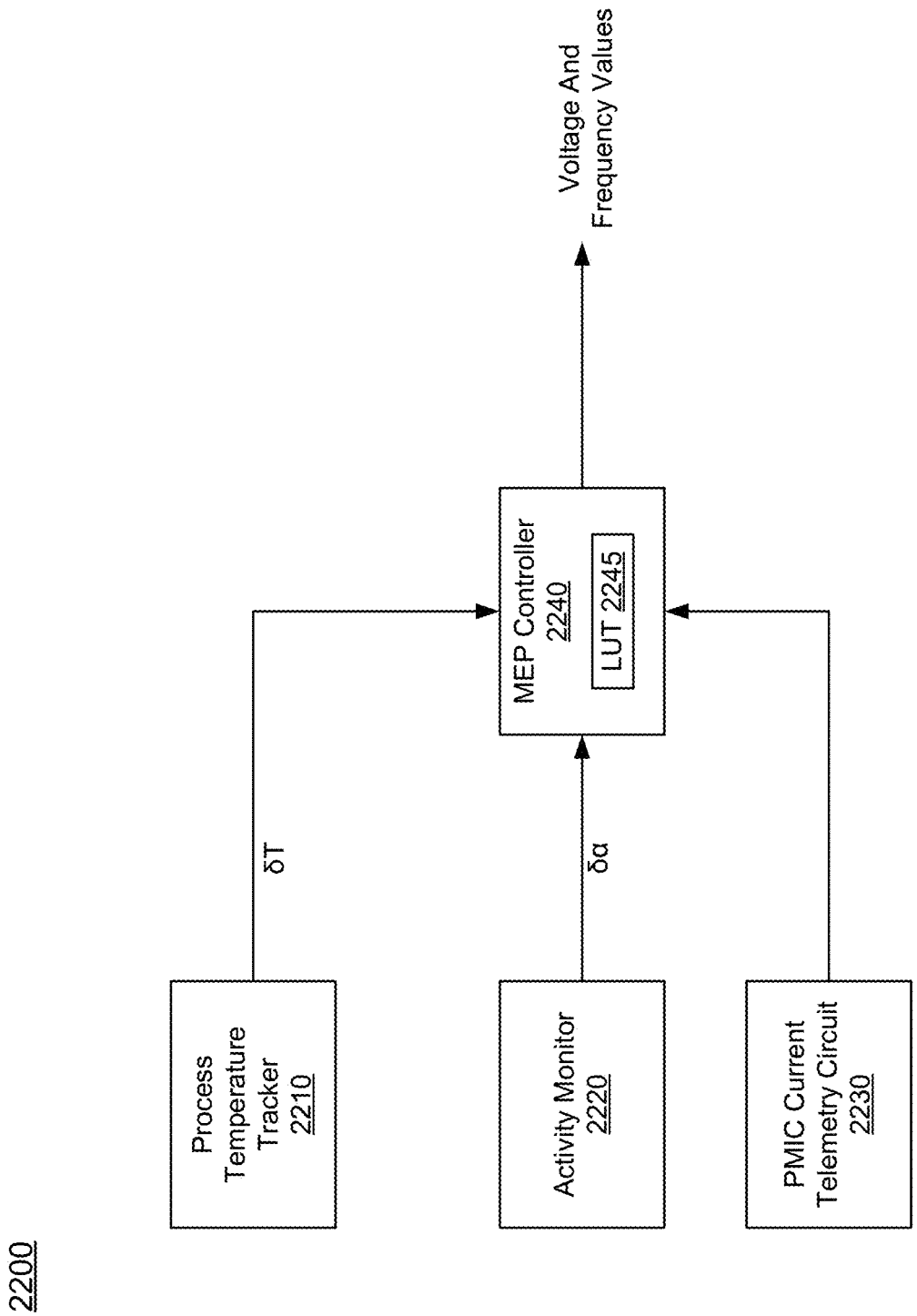
FIG. 22 is a block diagram of a MEP controller in accordance with an embodiment of the present invention.

Referring now to FIG. 22, shown is a block diagram of a MEP controller in accordance with an embodiment of the present invention. As shown in FIG. 22, controller 2200 may be implemented as a hardware circuit. In one implementation, MEP controller 2200 may be implemented within a power controller of a processor, such as a PCU. In other embodiments understand that the MEP controller may be implemented as a separate hardware circuit that provides output information in the form of a MEP performance state (e.g., including an optimal operating voltage and optimal operating frequency) to a power controller. In still other embodiments, understand that the various constituent components of MEP controller 2200 may be distributed, with certain information being provided to MEP control circuitry and in turn additional information being output to, e.g., a power controller.

As illustrated in FIG. 22, MEP controller 2200 includes a process-temperature tracker 2210. In embodiments, process-temperature tracker 2210 may receive incoming thermal information, e.g., in the form of temperature values from one or more temperature sensors adapted throughout the processor. In an embodiment, temperature may be determined using a calibrated ring oscillator or similar circuitry. Process-temperature tracker 2210 may process the incoming thermal information to provide a temperature change (a change in temperature ($\delta T$). To this end, process-temperature tracker 2210 may maintain information regarding prior temperature information received to provide this change in temperature, which may be performed on an evaluation cycle-by-evaluation cycle basis. In other cases, tracker 2210 may maintain a moving average to filter or smooth out instantaneous variations. In any event, tracker 2210 outputs this change in thermal tracking information to a MEP controller 2240. In addition, process-temperature tracker 2210 may include a processor sensor which may be implemented using a ring oscillator to detect whether the silicon is of, e.g., a typical, slow or fast variation. Such sensor may provide a reference to set an initial MEP value. More specifically, a MEP controller may use this process variation, along with voltage/frequency sweep information to determine the initial MEP value.

As further shown, MEP controller 2200 also includes an activity monitor 2220. In some cases, note that activity monitor 2220 may receive incoming microarchitectural monitoring information, e.g., from a performance monitoring unit (PMU) of the processor. In an embodiment, activity factor estimation can be determined using micro-architectural and performance counters for switching events occurring at instruction level, e.g., cache hits, cache miss, loads, fused multiply add (FMA) retires, instruction retires, etc. A measure of activity can be inferred from these counters. As such, it is possible for monitor 2220 to be implemented in the PMU itself. Activity monitor 2220 may maintain information regarding prior activity information to provide this change in temperature, which may be performed on an evaluation cycle-by-evaluation cycle basis. In other cases, activity monitor 2220 may maintain a moving average to filter or smooth out instantaneous variations. In any event, activity monitor 2220 outputs this change in activity tracking information to MEP controller 2240.

Note that process-temperature tracker 2210 and activity monitor 2220 may operate during runtime to provide information that may be used to adjust optimal voltage during runtime based on workload and/or temperature of the processor. Thus in the embodiment of FIG. 22, trackers 2210, 2220 may perform rapid $V_{OPT}$ adjustment during run time, based on data from process, temperature and activity monitors/sensors. Note that in different embodiments, the sensors and MEP controller can be on-die or off-die.

Still further, understand that a sweeping-type MEP determination also may be performed, e.g., one time upon initialization of the processor. In addition, at process-sensitive time durations (which may be on the order of months, years or so forth), this sweep operation may be performed to determine an updated optimum MEP. As such as further illustrated in FIG. 22, a power management integrated circuit (PMIC) current telemetry circuit 2230 also may be present. Telemetry circuit 2230 may be implemented within integrated voltage regulator circuitry of the processor. In other cases, telemetry circuit 2230 may be separate from such voltage regulator, but in either case receives current sensing information from the voltage regulator. Telemetry circuit 2230 may provide power data that can be used to compute energy (e.g., according to Equation 1 above) for one-time MEP tracking to obtain $V_{OPT}$. In other embodiments, this sweep tracking may be avoided where a prior value is preloaded. Based on this information, current telemetry information may be provided to MEP controller 2240.

In various embodiments, MEP controller 2240 may perform both a computation of long-term MEPs, as well as real time adjustment to such MEP values, using information from process-temperature tracker 2210 and activity monitor 2220. As such, MEP control circuit 2240 may perform calculations based on the change in tracking information received from process-temperature tracker 2210 and activity monitor 2220. Based on the computations, access to a lookup table 2245 may occur to determine an optimal MEP performance state. This optimal MEP performance state may be output to power control circuitry to control operating voltage and/or operating frequency of one or more cores or other processing circuits. Understand while shown at this high level in the embodiment of FIG. 22, many variations and alternatives are possible.

Figure 23:
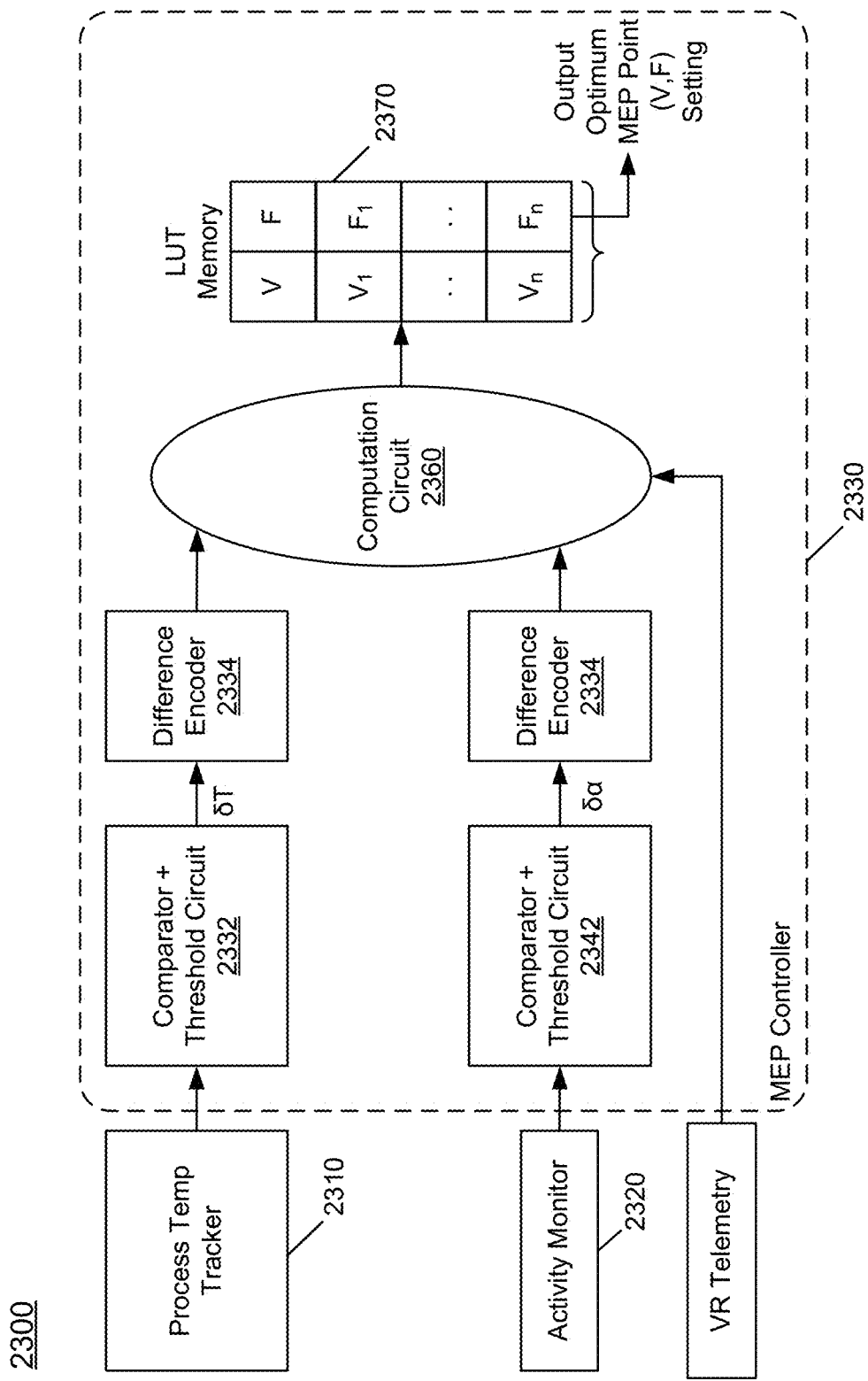
FIG. 23 is a block diagram of a MEP controller in accordance with another embodiment of the present invention.

Referring now to FIG. 23, shown is a block diagram of a MEP controller in accordance with another embodiment of the present invention. In the embodiment of FIG. 23, an environment 2300 is shown with further detail that illustrates operations performed based on receipt of thermal tracking information and activity tracking information from corresponding process-temperature tracker 2310 and activity monitor 2320.

As illustrated in FIG. 23, a MEP controller 2330 includes corresponding comparator and threshold circuitry 2332, 2342 to receive the incoming change in tracking information and compare it to corresponding thresholds, which in embodiments may be programmable thresholds. In an embodiment, MEP controller 2330 may periodically compare (and threshold) temperature and activity factor digital codes from corresponding sensors. When it is determined that the change in tracking information exceeds the corresponding threshold, the change in tracking information values ($\delta T$ and $\delta \alpha$) are provided to corresponding difference encoders 2334, 2344. Encoders 2334, 2344 may encode maximum difference values (e.g., $\delta T$, $\delta \alpha$) into discrete steps. In embodiments herein, these difference encoders may include or be coupled to one or more tracking tables to output a corresponding step value (n and/or m) based on the level of the change in tracking information. For example, in an embodiment one or more LUTs may be populated with a realistic range of pre-characterized temperature change ($\delta T$) and workload shift ($\delta \alpha$) data. In one embodiment, a linear model may be used with activity triggers for every 2× change in workload and/or 55° C. change in temperature.

As further illustrated in FIG. 23, these step values are provided to a computation circuit 2360, which may process these values to determine an optimal step value. In one embodiment, computation circuit 2360 may compute this optimal step value according to: δT−δα. More particularly, a sum operation may be performed on the step values corresponding to the tracking changes. In an embodiment, computation circuit 2360 may compute a sum (or difference) of (δT−δα), based on the temperature and activity sensor data, and may be implemented as a low overhead digital adder/subtraction circuit. Computation circuit 2360, in an embodiment, may also receive telemetry information from a voltage regulator, which may provide information regarding current consumption.

As further illustrated, MEP controller 2330 includes a lookup table memory 2370, which includes a plurality of entries each including a voltage value and a frequency value. MEP controller 2330 may access a given entry of memory 2370 using the optimal step value to output an optimum MEP performance state (including an optimal operating voltage and an optimal operating frequency). In one particular example, for a +55° C., −4× activity change, values of δT=+1, δα=−2 may be generated, giving 1−(−2)=3 steps (2+steps from activity, and 1 positive step from temperature). Here, 50 mV=1 step, and 55° C. change=1 step. So the new $V_{OPT}$ is 0.2V (an original value)+0.15 V, resulting in 0.35V. Note that in an embodiment, the optimal step value may be converted into a memory address to access LUT 2370, which provides the final/optimal MEP point (V, F) setting to be used to set operating voltage and frequency for one or more domains of the processor.

In embodiments, MEP controller 2330 may provide this information to a power controller that in turn may control one or more voltage regulators and/or one or more clock generation circuits to output one or more operating voltages and/or one or more clock signals at the given operating frequency. Understand while shown at this high level in the embodiment of FIG. 23, many variations and alternatives are possible.

Embodiments thus may realize a dramatic reduction in computation and speed by effectively using sensor data and heuristics to intelligently adjust the optimum MEP in a relative manner, as compared to an expensive absolute MEP tracking technique. Understand that while this example uses trigger steps of 50° C. and 2× workload changes, the extent of discrete steps/action may differ. And with embodiments, per-die and/or per-process skew silicon adjustments may be realized by way of LUT information determined during manufacture. In other cases, silicon-aging sensors may be used to obtain age-based deterioration information to automatically adjust for long-term MEP shifts.

Table 2 below illustrates an example a pre-characterized lookup table for determining activity-based step changes. Understand that a similar table may be used for determining temperature-based changes, where resulting step values can be summed as discussed above to obtain an optimal step value that may be used to access a voltage-frequency table.

TABLE 2

| Activity (δα) | Temperature (δT) | VoptStep |
|---|---|---|
| 2x | 110 | −1 |
| 4x | 110 | −2 |
| 8x | 110 | −3 |
| 16x | 110 | −4 |
| 0.5x | 110 | 1 |
| 0.25x | 110 | 2 |
| 0.125x | 110 | 3 |
| 0.0625x | 110 | 4 |

With embodiments, dynamic computation of energy consumption is performed, which is a more apt metric for extending battery life as compared to conventional power monitoring-based techniques. Stated another way, minimum power consumption modes do not necessarily translate into minimum energy modes. Embodiments thus provide sensor-driven, fast real-time MEP tracking and re-locking, eliminating the need for slower voltage/frequency-based sweep techniques, with low hardware cost. Note that in some cases, at least portions of the operations performed by a MEP controller may be implemented within other hardware, firmware and/or software, e.g., of a power controller.

The following examples pertain to further embodiments.

In one example, a processor comprises: at least one core to execute instructions; at least one temperature sensor to output thermal information regarding the processor; an activity monitor to monitor activity of the processor and to output activity information based at least in part thereon; and a MEP controller coupled to the at least one temperature sensor and the activity monitor. The MEP controller may be configured to: generate a change in thermal tracking information, based at least in part on prior thermal information and the thermal information; generate a change in activity tracking information, based at least in part on prior activity information and the activity information; and determine a MEP performance state based at least in part on the change in thermal tracking information and the change in activity tracking information.

In an example, the MEP controller comprises: an encoder to encode the change in thermal tracking information into a first step value and an encoder to encode the change in activity tracking information into a second step value; and a calculation circuit to compute a step value based on the first step value and the second step value.

In an example, the MEP controller further comprises a control circuit to output a MEP performance state based on the step value.

In an example, the processor further comprises a lookup table comprising a plurality of entries each to store an operating voltage and an operating frequency, where the control circuit is to access the lookup table using the step value.

In an example, the calculation circuit is to sum the first step value and the second step value to compute the step value.

In an example, the processor further comprises at least one tracking table including a plurality of entries each to associate the change in thermal tracking information with a corresponding first step value.

In an example, the encoder is to access the at least one tracking table with the change in thermal tracking information to obtain the first step value.

In an example, the at least one tracking table comprises pre-characterized temperature change data.

In an example, the processor further comprises a power controller coupled to the MEP controller, the power controller to cause a voltage regulator to output a first operating voltage according to the MEP performance state and to cause a clock generation circuit to output a clock signal at a first operating frequency according to the MEP performance state.

In an example, the MEP controller further comprises a sweep circuit to trigger a sweep of voltage/frequency values to determine an optimum MEP performance state, the sweep circuit to trigger the sweep in response to expiration of an aging timer to indicate expiration of a process-sensitive time duration.

In an example, the sweep circuit is further to trigger the sweep of voltage/frequency values to determine an initial optimum MEP performance state upon initialization of the processor.

In an example, the processor further comprises a configuration storage to store at least an optimal voltage of the initial optimum MEP performance state.

In an example, the MEP controller is to prevent update to the MEP performance state if the change in thermal tracking information and the change in activity tracking information are less than a corresponding threshold.

In another example, a method comprises: receiving, in a MEP controller of a processor, thermal tracking information regarding a temperature of the processor and activity tracking information regarding activity of the processor; generating a change in tracking information, based at least in part on the thermal tracking information and the activity tracking information; computing a step value based at least in part on the change in tracking information; and outputting a MEP performance state using the step value.

In an example, the method further comprises determining a process variation and sweeping a plurality of voltage/frequency values to determine an initial optimum MEP performance state upon initialization of the processor.

In an example, the method further comprises determining a process variation and sweeping the plurality of voltage/frequency values to determine an updated optimum MEP performance state, in response to expiration of a process-sensitive time duration.

In an example, the method further comprises: accessing a lookup table comprising a plurality of entries each to store an operating voltage and an operating frequency using the step value to obtain the MEP performance state; and accessing at least one tracking with the change in tracking information to obtain one or more step values used to compute the step value.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor comprising: a plurality of cores: at least one sensor to output thermal information regarding the processor; at least one process sensor to output process variation information regarding the processor; an activity monitor to monitor activity of the processor and to output activity information based at least in part thereon; and a MEP controller coupled to the at least one sensor, the at least one process sensor and the activity monitor. The MEP controller may be configured to determine an initial MEP operating point based on a sweep of voltage/frequency values and the process variation information, and thereafter to adjust the initial MEP operating point to an updated MEP operating point based at least in part on the thermal information and the activity information and without the sweep of voltage/frequency values. The system may further include a dynamic random access memory coupled to the processor.

In an example, the MEP controller is to: generate a change in thermal tracking information, based at least in part on prior thermal information and the thermal information; generate a change in activity tracking information, based at least in part on prior activity information and the activity information; and determine the updated MEP operating point based at least in part on the change in thermal tracking information and the change in activity tracking information.

In an example, the MEP controller comprises: an encoder to encode the change in thermal tracking information into a first step value and an encoder to encode the change in activity tracking information into a second step value; and a calculation circuit to compute a step value based on the first step value and the second step value, and where the MEP controller is to determine the updated MEP operating point based on the step value.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    at least one core to execute instructions;
    at least one temperature sensor to output thermal information regarding the processor;
    an activity monitor to monitor activity of the processor and to output activity information based at least in part thereon; and
    a minimum energy point (MEP) controller coupled to the at least one temperature sensor and the activity monitor, the MEP controller to:
        generate a change in thermal tracking information, based at least in part on prior thermal information and the thermal information;
        generate a change in activity tracking information, based at least in part on prior activity information and the activity information; and
        determine a MEP performance state based at least in part on the change in thermal tracking information and the change in activity tracking information.

2. The processor of claim 1, wherein the MEP controller comprises:
    an encoder to encode the change in thermal tracking information into a first step value and an encoder to encode the change in activity tracking information into a second step value; and
    a calculation circuit to compute a step value based on the first step value and the second step value.

3. The processor of claim 2, wherein the MEP controller further comprises a control circuit to output the MEP performance state based on the step value.

4. The processor of claim 3, further comprising a lookup table comprising a plurality of entries each to store an operating voltage and an operating frequency, wherein the control circuit is to access the lookup table using the step value.

5. The processor of claim 3, wherein the calculation circuit is to sum the first step value and the second step value to compute the step value.

6. The processor of claim 2, further comprising at least one tracking table including a plurality of entries each to associate the change in thermal tracking information with a corresponding first step value.

7. The processor of claim 6, wherein the encoder is to access the at least one tracking table with the change in thermal tracking information to obtain the first step value.

8. The processor of claim 7, wherein the at least one tracking table comprises pre-characterized temperature change data.

9. The processor of claim 1, further comprising a power controller coupled to the MEP controller, the power controller to cause a voltage regulator to output a first operating voltage according to the MEP performance state and to cause a clock generation circuit to output a clock signal at a first operating frequency according to the MEP performance state.

10. The processor of claim 1, wherein the MEP controller further comprises a sweep circuit to trigger a sweep of voltage/frequency values to determine an optimum MEP performance state, the sweep circuit to trigger the sweep in response to expiration of an aging timer to indicate expiration of a process-sensitive time duration.

11. The processor of claim 10, wherein the sweep circuit is further to trigger the sweep of voltage/frequency values to determine an initial optimum MEP performance state upon initialization of the processor.

12. The processor of claim 11, further comprising a configuration storage to store at least an optimal voltage of the initial optimum MEP performance state.

13. The processor of claim 1, wherein the MEP controller is to prevent update to the MEP performance state if the change in thermal tracking information and the change in activity tracking information are less than a corresponding threshold.

14. A non-transitory machine-readable medium having stored thereon instructions, which if performed by a machine cause the machine to perform a method comprising:
    receiving, in a minimum energy point (MEP) controller of a processor, thermal tracking information regarding a temperature of the processor and activity tracking information regarding activity of the processor;
    generating a change in tracking information, based at least in part on the thermal tracking information and the activity tracking information;
    computing a step value based at least in part on the change in tracking information; and
    outputting a MEP performance state using the step value.

15. The non-transitory machine-readable medium of claim 14, wherein the method further comprises determining a process variation of the processor and sweeping a plurality of voltage/frequency values to determine an initial optimum MEP performance state upon initialization of the processor.

16. The non-transitory machine-readable medium of claim 15, wherein the method further comprises sweeping the plurality of voltage/frequency values to determine an updated optimum MEP performance state, in response to expiration of a process-sensitive time duration.

17. The non-transitory machine-readable medium of claim 14, wherein the method further comprises:
    accessing a lookup table comprising a plurality of entries each to store an operating voltage and an operating frequency using the step value to obtain the MEP performance state; and
    accessing at least one tracking table with the change in tracking information to obtain one or more step values used to compute the step value.

18. A system comprising:
    a processor comprising:
        a plurality of cores;
        at least one sensor to output thermal information regarding the processor;
        at least one process sensor to output process variation information regarding the processor;
        an activity monitor to monitor activity of the processor and to output activity information based at least in part thereon; and
        a minimum energy point (MEP) controller coupled to the at least one sensor, the at least one process sensor and the activity monitor, wherein the MEP controller is to determine an initial MEP operating point based on a sweep of voltage/frequency values and the process variation information, and thereafter to adjust the initial MEP operating point to an updated MEP operating point based at least in part on the thermal information and the activity information and without the sweep of voltage/frequency values; and a dynamic random access memory coupled to the processor.

19. The system of claim 18, wherein the MEP controller is to:
generate a change in thermal tracking information, based at least in part on prior thermal information and the thermal information;
generate a change in activity tracking information, based at least in part on prior activity information and the activity information; and
determine the updated MEP operating point based at least in part on the change in thermal tracking information and the change in activity tracking information.

20. The system of claim 19, wherein the MEP controller comprises:
an encoder to encode the change in thermal tracking information into a first step value and an encoder to encode the change in activity tracking information into a second step value; and
a calculation circuit to compute a step value based on the first step value and the second step value, and wherein the MEP controller is to determine the updated MEP operating point based on the step value.

* * * * *